US008494754B2

(12) United States Patent
Fukumoto et al.

(10) Patent No.: US 8,494,754 B2
(45) Date of Patent: Jul. 23, 2013

(54) CONDITION EVALUATION SYSTEM FOR ENGINE-DRIVEN TRAVELING VEHICLE

(75) Inventors: Toshiya Fukumoto, Takarazuka (JP); Kentaro Nakamura, Wakayama (JP)

(73) Assignee: Kubota Corporation, Osaka (JP)

( * ) Notice: Subject to any disclaimer, the term of this patent is extended or adjusted under 35 U.S.C. 154(b) by 202 days.

(21) Appl. No.: 12/877,486

(22) Filed: Sep. 8, 2010

(65) Prior Publication Data

US 2011/0172895 A1 Jul. 14, 2011

(30) Foreign Application Priority Data

Jan. 13, 2010 (JP) ................................ 2010-005284
Jan. 13, 2010 (JP) ................................ 2010-005286

(51) Int. Cl.
*F02D 41/30* (2006.01)
*G01F 9/023* (2006.01)

(52) U.S. Cl.
USPC .......................................... 701/103; 701/123

(58) Field of Classification Search
USPC ........................... 701/123, 50, 101–103, 110
See application file for complete search history.

(56) References Cited

U.S. PATENT DOCUMENTS 4,559,599 A * 12/1985 Habu et al. ...................... 701/62
5,806,491 A * 9/1998 Ohtake ........................ 123/435
6,425,370 B1 * 7/2002 Kramer ........................ 123/357
7,676,318 B2 * 3/2010 Allain .......................... 701/103
2006/0287841 A1 * 12/2006 Hoshi et al. ................... 702/182
2009/0143934 A1 * 6/2009 Motonaga et al. .............. 701/29
2009/0144150 A1 * 6/2009 Sakakibara et al. ............ 705/14

FOREIGN PATENT DOCUMENTS

| | | | |
|---|---|---|---|
| JP | 62234741 | A | 10/1987 |
| JP | 9224408 | A | 9/1997 |
| JP | 9224410 | A | 9/1997 |
| JP | 9224411 | A | 9/1997 |
| JP | 10197314 | A | 7/1998 |
| JP | 2000184804 | A | 7/2000 |
| JP | 2000184805 | A | 7/2000 |
| JP | 2001164981 | A | 6/2001 |
| JP | 2004-211613 | * | 7/2004 |
| JP | 2004211613 | A | 7/2004 |
| JP | 2006076415 | A | 3/2006 |
| WO | 2007072701 | A1 | 6/2007 |

* cited by examiner

*Primary Examiner* — Stephen K Cronin
*Assistant Examiner* — Carl Staubach
(74) *Attorney, Agent, or Firm* — The Webb Law Firm

(57) ABSTRACT

A fuel consumption amount evaluation system is disclosed. The system includes a rotational speed detecting section (5*b*) for detecting an engine rotational speed of the engine-driven traveling vehicle as a measured rotational speed, an accelerator opening degree detecting section (5*a*) for detecting an accelerator opening degree, a fuel injection amount calculating means (50) for calculating a fuel injection amount per predetermined unit from the accelerator opening degree and the measured rotational speed, and a mileage evaluating section (54) for effecting a mileage evaluation based on the fuel injection amount calculated by the fuel injection amount calculating means (50).

13 Claims, 13 Drawing Sheets

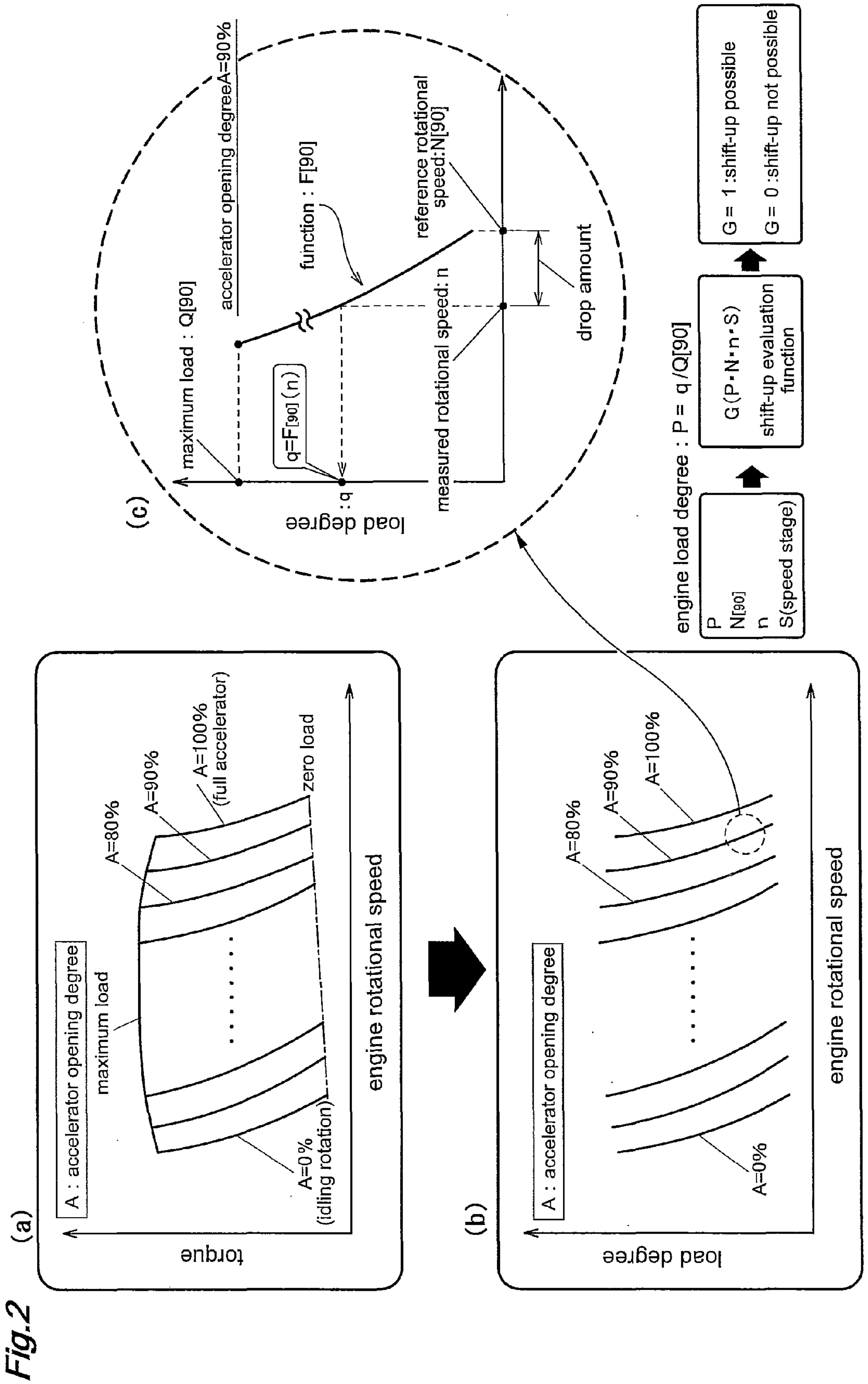
Fig.2
(a)
A : accelerator opening degree
torque
maximum load
A=80%
A=90%
A=100%
(full accelerator)
zero load
A=0%
(idling rotation)
engine rotational speed
(b)
A : accelerator opening degree
load degree
A=80%
A=90%
A=100%
A=0%
engine rotational speed
(c)
accelerator opening degreeA=90%
maximum load : Q[90]
function : F[90]
load degree
q
q=F[90](n)
measured rotational speed: n
reference rotational speed:N[90]
drop amount
engine load degree : P = q/Q[90]
P
N[90]
n
S(speed stage)
G(P•N•n•S)
shift-up evaluation function
G = 1 :shift-up possible
G = 0 :shift-up not possible

CONDITION EVALUATION SYSTEM FOR ENGINE-DRIVEN TRAVELING VEHICLE

BACKGROUND OF THE INVENTION

1. Field of the Invention

The present invention relates to an evaluation system for evaluating vehicle condition of an engine-driven traveling vehicle. Such a system includes, for instance, a fuel consumption amount evaluation system for evaluating a fuel consumption amount by calculating a fuel consumption amount during traveling, a vehicle driving evaluation system for evaluating vehicle based on engine load, and so on.

2. Description of the Related Art

As apparatuses for calculating and displaying a fuel consumption amount, there are known an apparatus configured to obtain a fuel consumption amount through determination of the actual fuel flow rate with a flowmeter mounted in fuel piping, and an apparatus configured to obtain a fuel consumption amount through determination of the liquid level in the fuel tank. However, an apparatus for precision determination of the fuel flow rate in fuel piping is costly. Also, the calculation of short-term fuel consumption amount based on determination of an amount of fuel remaining in the fuel tank with reasonably high precision is difficult by itself.

On the other hand, in case the engine-driven traveling vehicle has an electronically controlled engine, such calculation of short-term fuel consumption amount is possible and feasible, based on a value of fuel injection amount exhibited by its common rail. The calculation is also possible and feasible in case the engine-driven traveling vehicle has an electronic governor controlled engine, based on detection of the position of its control rack. For example, a technique of precisely determining a fuel consumption amount based on a fuel injection amount by a fuel injection controller is known from JP 10-197314 A (see paragraph [0076] and FIG. 1). A fuel consumption amount indicating apparatus configured to calculate and display a fuel consumption amount based on detected position of the control rack is known from JP 2001-164981 A (see paragraphs [0007]-[0013] and FIG. 3). However, such calculation of fuel consumption amount is difficult with an engine-driven traveling vehicle having a mechanical governor controlled type engine, rather than an electronically driven engine or electronic governor controlled engine.

As an example of a vehicle driving evaluation system, JP 2006-076415 A (see paragraph [0006]-[0022] and FIG. 1) discloses a fuel saving driving ("eco-driving") evaluation system configured to display or issue, only when needed, a real advice or a voice alarm relating to a speed changing operation. This fuel saving driving evaluation system includes an engine rotational speed sensor for determining an engine rotational speed of the vehicle, an accelerator opening degree sensor (e.g. a throttle position sensor), a vehicle speed sensor for determining a vehicle speed, a timer, a fuel meter for determining a fuel flow (delivery) rate, and an engine load sensor for determining an engine torque. Measured engine rotational speed, accelerator opening degree, vehicle speed, lapsed time, fuel flow (delivery) rate and engine load are stored as vehicle signals. Based on these vehicle signals, a vehicle mounted controller unit calculates a fuel consumption amount, an acceleration rate, a deceleration rate, and a travel distance of the vehicle. The vehicle mounted controller unit is configured also to display/issue a visual message or a voice message equivalent thereto which urges a shift-up operation (e.g. a message "a shift-up is recommended") on the conditions that the engine rotational speed and the engine load are not less than predetermined values and the unit does not identify any climbing condition and that a message warning an excessive stepping-on of the accelerator pedal (e.g. a message "the accelerator is over-stepped) is not being displayed and the current speed of a multiple-step speed changer is at a speed lower than the highest speed thereof. Thereafter, when the engine rotational speed becomes below the predetermined value or the engine load becomes below the predetermined value or a judgment of a climbing condition is being issued, the controller unit stops the displaying of the message prompting a shift-up operation (the message "a shift-up is recommended") and then returns the display to its normal screen.

Such driving evaluation system as above is capable of notifying the driver of various driving evaluations. However, the system requires a great number of sensors for obtaining many control parameters. In particular, the system would be costly if sufficient precision is to be obtained in the detection of the fuel flow rate by the fuel flowmeter or the detection of the engine load by the engine load sensor. Moreover, the system would result in a significant burden on both the hardware and the software, due to the large number of signals to be inputted to the controller unit.

SUMMARY OF THE INVENTION

Hence, there is a need for a novel condition evaluation system for evaluating vehicle conditions of an engine-driven traveling vehicle. One example of such system is a fuel consumption amount evaluation system which has a simple construction, but yet is capable of effectively calculating a fuel consumption amount of an engine-driven traveling vehicle having a mechanical governor controlled type engine, rather than an electronically controlled engine or electronic governor controlled engine and then effecting an evaluation of the fuel consumption amount such as displaying it. Also desired is a driving evaluation system which is capable of assisting an appropriate vehicle drive based on an engine load, with simple construction and with a fewer number of detection signals to be inputted as control parameters to its control unit.

A fuel consumption amount evaluation system as an example of a condition evaluation system relating to the present invention, comprises:

a rotational speed detecting section for detecting an engine rotational speed of the engine-driven traveling vehicle as a measured rotational speed;

an accelerator opening degree detecting section for detecting an accelerator opening degree;

a fuel injection amount calculating means for calculating a fuel injection amount per predetermined unit from the accelerator opening degree and the measured rotational speed, based on a correlation prepared for each accelerator opening degree between an engine rotational speed drop amount from a reference rotational speed which is the engine rotational speed under a zero load condition of the engine and a change in the fuel injection amount; and a mileage evaluating section for effecting a mileage evaluation based on the fuel injection amount calculated by the fuel injection amount calculating means.

The present invention was made based on a finding that a fuel injection amount can be deduced from an accelerator opening degree and a measured engine rotational speed, through utilization of correlation existing between the fuel injection amount the accelerator opening degree, the correlation being established based on a characteristics curve obtained by determining, for each accelerator opening degree, relationship between a torque range from the zero load degree (idling) to the maximum load degree, and the engine rotational speed.

Therefore, if correlation is established in advance for each accelerator opening degree between an engine rotational speed drop amount from a reference rotational speed which is the rotational speed of the engine under a zero-load condition of the engine and a fuel injection amount, and if a plurality of such accelerator opening degree-by-degree correlations are set in advance in the fuel injection amount calculating means, it is possible to calculate a fuel injection amount per a predetermined unit from the accelerator opening degree detected by the accelerator opening degree detecting section and the measured rotational speed detected by the rotational speed detecting section. To this end, it is possible to utilize detection sensors such as an accelerator opening degree sensor and a rotational speed sensor that are normally provided and mounted in a traveling vehicle. And, this calculated fuel injection amount can be used for e.g. a simple mileage evaluation in the form of a monitor display or a voice message notifying a fuel consumption amount (to be referred to simply as "mileage" also hereinafter) or a driving evaluation for evaluating whether an economical driving (to be referred to simply as "eco-driving" also hereinafter) in compliance with certain preset rules is being realized or not.

According to one preferred embodiment of the present invention, said fuel injection amount calculating means includes:

a calculation managing section for setting a correlation between the measured rotational speed and the fuel injection amount per predetermined unit, the correlation being determined based on the accelerator opening degree detected by the accelerator opening degree detecting section; and a calculation executing section for deriving the fuel injection amount from the measured rotational speed, based on the correlation set by the calculating managing section.

With the above construction, the correlation between the measured rotational speed and the fuel injection unit amount differing for each accelerator opening degree is appropriately selected and set by the calculation managing section, based on the accelerator opening degree detected by the accelerator opening degree detecting section. Upon setting of a correlation suited to the current accelerator opening degree, the calculation executing section can now derive the fuel injection amount from the measured rotational speed, with using this set correlation. With preparation of correlations for respective accelerator opening degrees, when an accelerator opening degree is adjusted by a driver's operation, a correlation suited to this particular accelerator opening degree is set within the fuel injection amount calculating means comprised normally of a computer program. Hence, from each one of measured rotational speeds inputted one after another, a fuel injection unit amount is calculated. Therefore, only with experimentally preparing the correlations for the respective accelerator opening degrees, without requiring any sensor signals for direct input to the fuel system, a fuel consumption amount can be calculated, and then based on this calculated fuel consumption amount, evaluation of fuel consumption amount, such as displaying of mileage, is effected.

According to a preferred embodiment of the present invention, said correlation set by said calculation managing section is used as an accelerator opening degree-by-degree function for outputting a fuel injection amount per rotation of the engine as said fuel injection amount in response to input of said measured rotational speed, and said accelerator opening degree-by-degree function is generated and stored in advance for each predetermined accelerator opening degree.

In this case, since the correlation set by the calculation managing section is constituted from an accelerator opening degree-by-degree function, if a function, or a so-called mathematical formula, is incorporated in advance in a program or the like for each one of accelerator opening degrees assigned by an interval satisfying required precision in between, a function to be used for a detected accelerator opening degree is determined and then simply by substituting a measured rotational speed for an input variable in that function, a fuel injection amount per engine rotation can be obtained. In doing this, if the function is a linear function, the calculation can be made simple advantageously. In case there occurs an error of ineligible magnitude when the correlation as the basis for the function is represented as a single straight line, the correlation should be represented as a curved line instead, that is, in the form of a multiple-order expression of two or more orders. However, for greater simplicity of the calculation, it is preferred that the accelerator opening degree-by-degree function be represented by a bent straight line, that is, a combination of linear functions defined respectively for a plurality of domains.

The simplest forms of mileage "evaluation" effected by the mileage evaluating section include displaying of a fuel consumption amount per unit time, displaying of a fuel consumption amount for a traveled distance, and displaying of mileage performance level ("eco-driving achievement level) obtained from such fuel consumption amounts. However, in case the engine-driven traveling vehicle mounting this fuel consumption amount (mileage) evaluation system is a work vehicle mounting an engine-driven utility implement, a more preferred mode of mileage evaluation will be evaluation of mileage evaluating not only the fuel injection amount, but an operation condition of the implement as a judgment condition of the mileage evaluation rule. When the implement gives high load to the engine, the mileage deteriorates as a matter of course. Therefore, by setting in advance in the mileage evaluating section a mileage evaluation rule that solves a question of whether the mileage is appropriate or not in the light of the load being currently applied by the implement. Then, if the system effects a comprehensive mileage evaluation resulting from this rule and displays this evaluation, this will be useful information for the driver of the work vehicle.

Although it is well-known that mileage is closely related to the vehicle speed, drivers in general tend to judge driving condition based solely on the information relating to mileage, without taking vehicle speed into account in correlation therewith. In order to circumvent this tendency and to prompt the driver to constantly drive the vehicle with constant awareness of the mileage and the vehicle speed in correlation with each other, according to one preferred embodiment of the present invention, information on the mileage evaluation by the mileage evaluating section is displayed on the monitor, together with vehicle speed information of the engine-driven traveling vehicle.

A vehicle driving evaluation system as a condition evaluation system for an engine-driven traveling vehicle relating to the present invention, comprises:

an engine rotational speed detecting section for detecting an engine rotational speed of the engine-driven traveling vehicle as a measured engine rotational speed;

an accelerator opening degree detecting section for detecting an accelerator opening degree;

an engine load degree calculating means for calculating an engine load degree from a partial load degree calculated from the measured engine rotational speed based on a correlation prepared for each accelerator opening degree between an engine rotational speed drop amount from a reference engine rotational speed which is the engine rotational speed under a zero load condition of the engine and a torque change, and also from a maximum load degree for each accelerator opening degree; and a driving information generating means for evaluating a driving condition of the vehicle based on said engine load degree calculated by said engine load degree calculating means, and generating appropriate driving information for the vehicle.

The present invention was made based on a finding that an engine load degree as a torque value or a torque related value can be estimated from an accelerator opening degree and a measured rotational speed of the engine, through utilization of correlation existing between the torque and the engine rotational speed, the correlation being established based on a characteristics curve obtained by determining, for each accelerator opening degree, relationship between a torque range from the zero load (idling) to the maximum load degree and the engine rotational speed.

Therefore, if an accelerator opening degree-by-degree correlation is established in advance between an engine rotational speed drop amount from a reference rotational speed which is the rotational speed of the engine under a zero-load condition of the engine, and a torque (engine load degree), and if a plurality of such accelerator opening degree-by-degree correlations are set in advance in the engine load degree calculating means, then, from an accelerator opening degree detected by the accelerator opening degree detecting section and the measured rotational speed detected by the rotational speed detecting section, a partial engine load degree at that moment is calculated. Further, based on that calculated partial load degree and the maximum engine load which is predetermined for the detected accelerator opening degree, the engine load degree is calculated as a proportion of the partial engine load relative to the maximum engine load. Therefore, the input parameters required for obtaining this engine load degree are only an accelerator opening degree and a measured rotational speed. With this, the engine load degree calculating means can be realized with a simple construction in terms of hardware as well as software. Once an engine load degree obtained, then, appropriate driving condition for this engine-driven vehicle will be obtained, based on this engine load degree. This appropriate driving information can be utilized for control signals for the vehicle driving devices or utilized for advising the driver to effect appropriate driving. For instance, the engine load degree can be displayed as it is in the form of a numerical value or in the form of a graphic icon or the like on the monitor, or notified in the form of a voice message. Furthermore, in accordance with a preset rule, a driving valuation, such as an instruction for a shift operation for the optimum speed stage, can be effected for assisting the driving.

According to one preferred embodiment of the present invention, said engine load degree calculating means includes:

a maximum load degree determining section for determining the maximum load degree according to the accelerator opening degree detected by the accelerator opening degree detecting section;

a partial load degree calculating section for calculating the partial load from the measured rotational speed based on the correlation specified by the accelerator opening degree; and a load degree calculating section for calculating the engine load degree from the maximum load degree and the partial load degree.

With this construction, with only detection of the accelerator opening degree, it becomes possible to utilize the correlation that is specified by this accelerator opening degree. Accordingly, the partial load degree calculating section will calculate a partial load degree from the measured rotational speed, and further the maximum load degree determining section will determine the maximum load degree based on this accelerator opening degree. Then, from the maximum load degree and the partial load degree thus obtained, the load degree calculating section will calculate the engine load degree. That is, a plurality accelerator opening degree-by-degree correlations will be set in advance so that one of them can be specified by a detected accelerator opening degree. Then, when the accelerator opening degree is adjusted by a driver's operation, a correlation suitable to that accelerator opening degree will be set inside the engine load degree calculating means comprised normally of a computer program, and the maximum load degree determining section will determine the maximum load degree also. With this, a partial load degree will be calculated based on each one of measured rotational speed inputted one after another. And, at this point, the engine load degree will be calculated. Therefore, with only experimental preparation of the accelerator opening degree-by-degree correlations, with inputs of only detection signals of accelerator opening degree and measured rotational speed, then an engine load degree can be calculated without requiring any signals from the sensors relating to engine load, such as a torque sensor, and based upon the engine load degree thus calculated, it becomes possible to effect various kinds of driving evaluations or notification to the driver.

According to one preferred embodiment of the present invention, said correlation comprises an accelerator opening degree-by-degree function that is generated and stored in advance for each predetermined accelerator opening degree and that outputs said partial load degree in response to a variable input of said measured rotational speed. Such an accelerator opening degree-by-degree function can be generated in advance for each of predetermined accelerator opening degrees and can be stored in a computer memory. As the above-described correlation is constructed as an accelerator opening degree-by-degree function, if a function, a so-called mathematical formula, for each accelerator opening degree assigned by an interval satisfying required precision is incorporated in a program or the like, a partial load degree can be obtained by simply effecting a function calculation with substituting a measured rotational speed for the variable input of that function. In this case, if this function is a linear function, the calculation thereof can be made simple advantageously. In case there occurs an error of ineligible magnitude when the correlation as the basis for the function is represented as a single straight line, the correlation should be represented as a curve, that is, a multiple-order expression of two or more orders. However, for greater simplicity of calculation, it is preferred that the accelerator opening degree-by-degree function be represented by a bent straight line, that is, a combination of linear functions defined respectively for a plurality of domains.

The engine load degree obtained by the engine load degree calculating means can be utilized for observance of the optimum speed shift position essential for eco-driving. To this end, preferably, there is provided a shift position detecting section for detecting a speed shift position of the vehicle; and said driving information generating means includes a shift-up evaluating section for determining or evaluating possibility (advisability) of shift-up operation based on the engine load degree and the speed shift position, and a shift-up information generating section for generating shift-up information based on the evaluation by the shift up operation possibility by the shift-up evaluating section. With this evaluation of whether a shift-up operation is possible (or advisable) based on the engine load degree, there can be realized eco-driving with minimizing the possibility of engine stall.

The simplest of various conceivable kinds of appropriate driving information generated by the driving information generating section will be direct displaying of the engine load degree or displaying of eco-driving level, or the shift-up information described above. However, in case the engine-driven traveling vehicle carrying that vehicle driving evaluation system thereon is a work vehicle mounting a work implement driven by engine power, a more preferred mode will be utilizing an operation condition of such an implement as a determination judgment condition for the appropriate evaluation rule. To this end, in case the engine-driven traveling vehicle is a work vehicle mounting a work implement driven by engine power, the driving information generating means can include an implement information generating section for generating implement driving assisting information. When the implement gives high load to the engine, the mileage deteriorates as a matter of course. Hence, a driving evaluation rule may be set in advance for solving a question of whether the engine load degree is appropriate or not in the light of the load being currently applied by the implement, and thus ultimately solving the question whether the driving is appropriate or not. Then, if the system effects a comprehensive driving evaluation resulting from this rule and displays this evaluation, this will be useful information for the driver of the work vehicle.

BRIEF DESCRIPTION OF THE DRAWINGS

FIG. 2 shows diagrams illustrating the principle of engine load degree calculating operation employed by the present invention.

DETAILED DESCRIPTION OF THE PREFERRED EMBODIMENTS

Preferred embodiments of the present invention will be described hereinafter with reference to the accompanying drawings.

Figure 1:
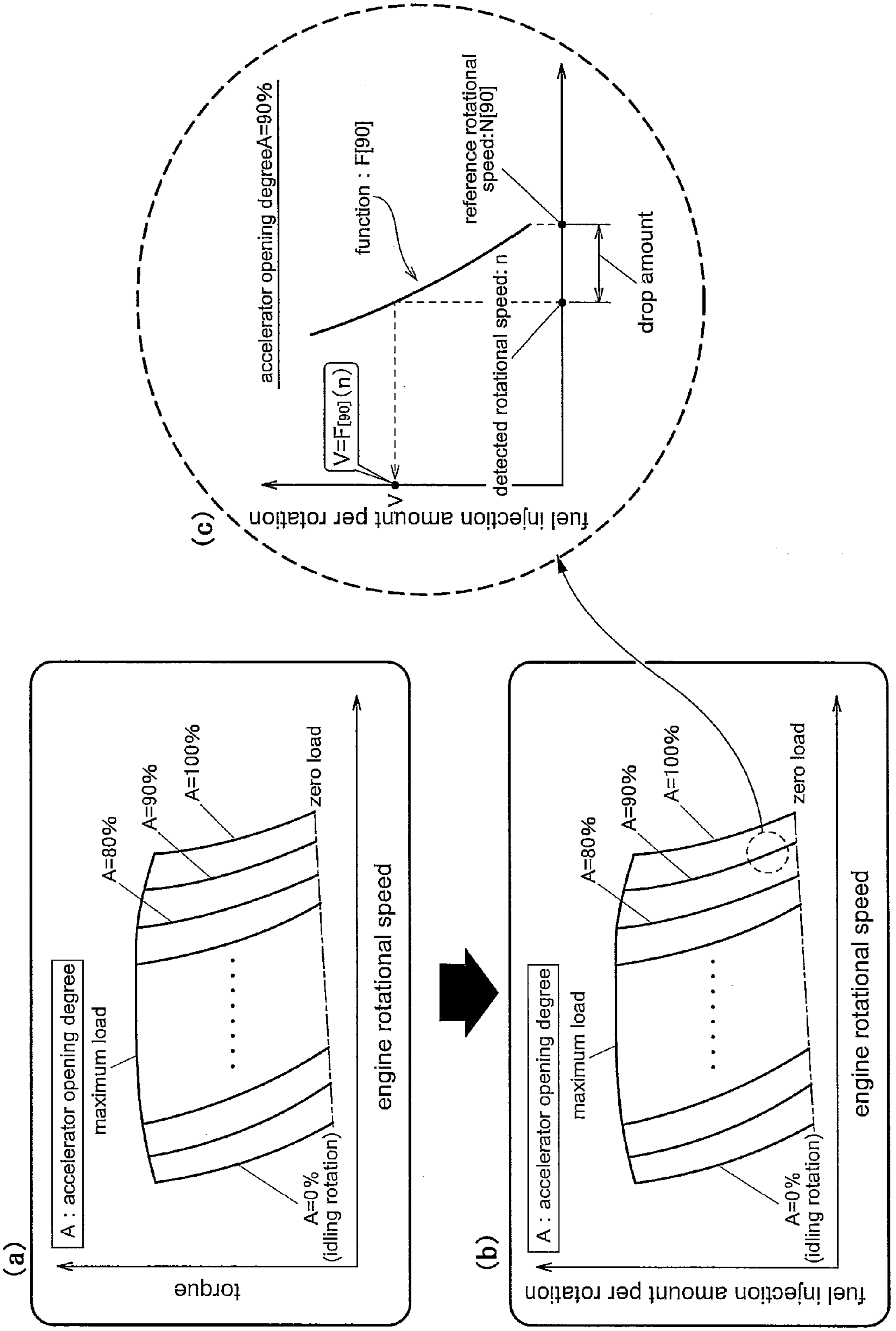
FIG. 1 shows diagrams illustrating the principle of fuel injection amount calculation employed by the present invention.

First, with reference to FIG. 1, there will be explained the principle of fuel injection amount calculating operation implemented by a fuel consumption amount evaluation system as an example of a condition evaluation system relating to the present invention. FIG. 1 (*a*) shows an engine performance curve of a particular engine as a subject of this fuel consumption amount evaluation system. The horizontal axis represents the rotational speed of the engine and the vertical axis represents the torque thereof. The maximum load degree line shows the relationship between the engine rotational speed and the torque when a braking force is applied to an engine output shaft by such a maximum amount not to cause an engine stall. The zero load line shows the relationship between the engine rotational speed and the torque when no load is applied to the engine output shaft, that is, during an idling operation. The plurality of vertical lines interconnecting the maximum load degree line and the zero load line at a plurality of points thereof are accelerator opening degree-by-degree characteristics curves, each of which shows an engine rotational speed that progressively decreases in association with application of increasing load from the zero-load rotational speed (idling rotational speed) for each of predetermined discrete accelerator opening degrees ranging from 0% to 100% (the amount of the reduction is commonly referred to as “engine rotational speed drop amount”).

FIG. 1 (*b*) shows a fuel injection amount characteristics curve with the vertical axis representing this time, instead of the torque value, a fuel injection amount per (one) rotation of the engine output shaft, at each predetermined discrete engine operation point on the engine performance curve shown in FIG. 1 (*a*). This fuel injection amount characteristics curve can be established, based on paired sets of engine rotational speed drop amounts and fuel injection amounts, each paired set representing an engine rotational speed drop amount that is an amount of reduction of engine rotational speed occurring in association with progressive application of increasing load to the engine output shaft relative to the zero-load engine rotational speed as a reference rotational speed and a fuel injection amount corresponding thereto. Therefore, once an accelerator opening degree: A determined as a parameter of this fuel injection amount characteristics curve, there is specified one particular fuel injection amount characteristics curve as being specified by this particular accelerator opening degree. Hence, with using such fuel injection amount characteristics curve, it is possible to derive a fuel injection amount per engine rotation corresponding to each current engine rotational speed.

Next, an operation of obtaining a fuel injection amount per rotation with using the fuel injection amount characteristics curve will be illustrated with reference to the enlarged graphic representation shown in FIG. 1 (*c*). In this particular example, it is assumed that an accelerator opening degree: A that is set by e.g. an accelerator lever and detected by e.g. a position sensor has a value of 90%. Upon detection of the accelerator opening degree being 90%, this sets a function: F [90] which represents a correlation between an engine rotational speed and a per-rotation fuel injection amount. The suffix value in the small parentheses [ ] shows the accelerator opening degree: A. Therefore, the function: F[90] is a relational expression that represents, at least approximately, the fuel injection amount characteristics curve for the accelerator opening degree: A of 90%. In practice, advantageously, the function: F[A] is provided as a linear function or a quadratic function that at least approximately represents the corresponding fuel injection amount characteristics curve. This does not mean however use of higher-degree functions is excluded from the intended scope of the present invention. Further, even if a linear function is employed, it is possible to employ a construction wherein the total range of engine rotational speed as the domain of definition is divided into a plurality of sections (domains) and a group of straight lines (that is, a bent or broken line as a whole) assigned for the respective divided domains can be used as the approximate representation of the actual fuel injection amount characteristics curve.

Referring back to FIG. 1 (*c*), the lowermost position on the fuel injection amount characteristics curve represented by the function: F[90] represents the zero-load driving condition. An engine rotational speed under this driving condition is set as a reference rotational speed: N and an engine rotational speed detected in realtime is n. Then, from the fuel injection amount characteristics curve, it is possible to grasp a change in the drop amount (i.e. a difference between the reference rotational speed and the detected engine rotational speed) and a corresponding change in the fuel injection amount. That is, it is possible to grasp how much engine speed to be dropped from the reference rotational speed to cause how much change in the fuel injection amount. Namely, if the detected engine rotational speed is n and the per-rotation fuel injection amount is V, from the above function: F[90], the following expression can be developed.

$$V=F[90](n)$$

With the above, the fuel injection amount: V can be calculated from the detected (measured) engine rotational speed: n.

Next, with reference to FIG. 2, there will be explained the principle of an engine load degree calculating operation employed by the vehicle driving evaluation system as an example of the inventive condition evaluation system. FIG. 2 is similar to FIG. 1. However, while the vertical axis in FIG. 1 (*b*) and FIG. 1 (*c*) represents the fuel injection amount per one rotation, the vertical axis in FIG. 2 (*b*) and FIG. 2 (*c*) represents the load degree.

FIG. 2 (*a*) is identical to FIG. 1 (*a*), therefore, explanation thereof will be omitted.

The load degree characteristics curve shown in FIG. 2 (*b*) can be established, based on paired sets of engine rotational speed drop amounts and fuel injection amounts, each paired set representing an engine rotational speed drop amount that is an amount of reduction of engine rotational speed occurring in association with application of progressively increasing load to the engine output shaft relative to the zero-load engine rotational speed as a reference rotational speed, and a load degree corresponding thereto. Therefore, once an accelerator opening degree: A is determined as a parameter of this load degree characteristics curve, there is specified one particular load degree characteristics curve as being specified by this particular accelerator opening degree. Hence, with using such load degree characteristics curve, it is possible to derive a load degree at that time point. In the meantime, the load degree that is derived with using the load degree characteristics curve has, as its domain of definition, the range between the zero load (idling load) and the maximum load degree. Therefore, in the following discussion, this load degree will be referred to as "a partial load degree".

Next, an operation of obtaining the partial load degree with using the load degree characteristics curve will be illustrated with reference to the enlarged graphic representation shown in FIG. 2 (*c*). In this particular example, it is assumed that an accelerator opening degree: A that is set by e.g. an accelerator lever and detected by e.g. a position sensor has a value of 90%. Upon detection of the accelerator opening degree being 90%, this sets a function: F [90] which represents a correlation between an engine rotational speed and a partial load degree. The suffix value in the small parentheses [ ] shows the accelerator opening degree: A. Therefore, the function: F[90] is a relational expression that represents, at least approximately, the load degree characteristics curve for the accelerator opening degree: A of 90%. In practice, advantageously, the function: F[A] is provided as a linear function or a quadratic function that at least approximately represents the corresponding load degree characteristics curve. This does not mean however the present invention excludes use of higher-degree functions, Further, even if a linear function is employed, it is possible to employ a construction wherein the total range of engine rotational speed as the domain of definition is divided into a plurality of sections (domains) and a group of straight lines (that is, a broken line as a whole) assigned for the respective divided domains can be used as the approximate representation of the actual load degree characteristics curve.

Referring back to FIG. 2 (*c*), the lowermost position on the load degree characteristics curve represented by the function: F[90] represents the zero-load driving condition. The engine rotational speed under this driving condition is set as a reference rotational speed: N and an engine rotational speed detected in realtime is n. Then, it is possible to grasp a change in the drop amount (i.e. a difference between the reference rotational speed and the detected engine rotational speed) and a corresponding change in the partial load degree, that is, how much engine speed to be dropped from the reference rotational speed to cause how much change in the partial load degree. Namely, if the detected (measured) engine rotational speed is n and the partial load degree is q, from the above function: F[90], the following expression can be developed.

$$q=F[90](n)$$

With the above, the partial load degree: q can be calculated from the detected (measured) engine rotational speed: n.

Upon successful calculation of the partial load degree: q, the ratio relative to the maximum load degree: Q[A] for the particular accelerator opening degree which constituted the basis of this calculation, in this particular case Q[90], e.g. the ratio therebetween can be defined as an engine load degree: P. That is, the engine load degree can be obtained by calculating:

$$P=q/Q[A]=F[A](n)/Q[A]$$

Driving at a low speed position and with a low partial load degree is not desirable from the viewpoint of the energy saving driving, the so-called eco-driving, and mileage can be improved with a shift-up operation as long as such operation will not result in an engine stall. Therefore, based on this calculated engine load degree, as appropriate driving information for the vehicle, a notice can be provided to the driver for prompting or recommending a shift-up operation of the speed changing device. For instance, as a driving evaluation expression can be provided which inputs values of: the obtained engine load degree: P, the reference rotational speed:

N, the measured rotational speed: n, the current speed position: S and outputs a value of either 1 for indicating shift-up operation being possible or a value 0 for indicating shift-up operation being not possible. And, as an example of such driving evaluation expression, a shift-up evaluation expression: G as follows can be experimentally constructed.

$G(P,N,n,S)\text{->}G=1$:shift-up possible, $G$=shift-up impossible.

And, by varying the mode of the output value of this driving evaluation expression, e.g. by outputting an appropriate speed position for the PTO, an appropriate engine rotational speed, various kinds of driving evaluation are made possible for assisting the driver.

Embodiment 1

Figure 3:
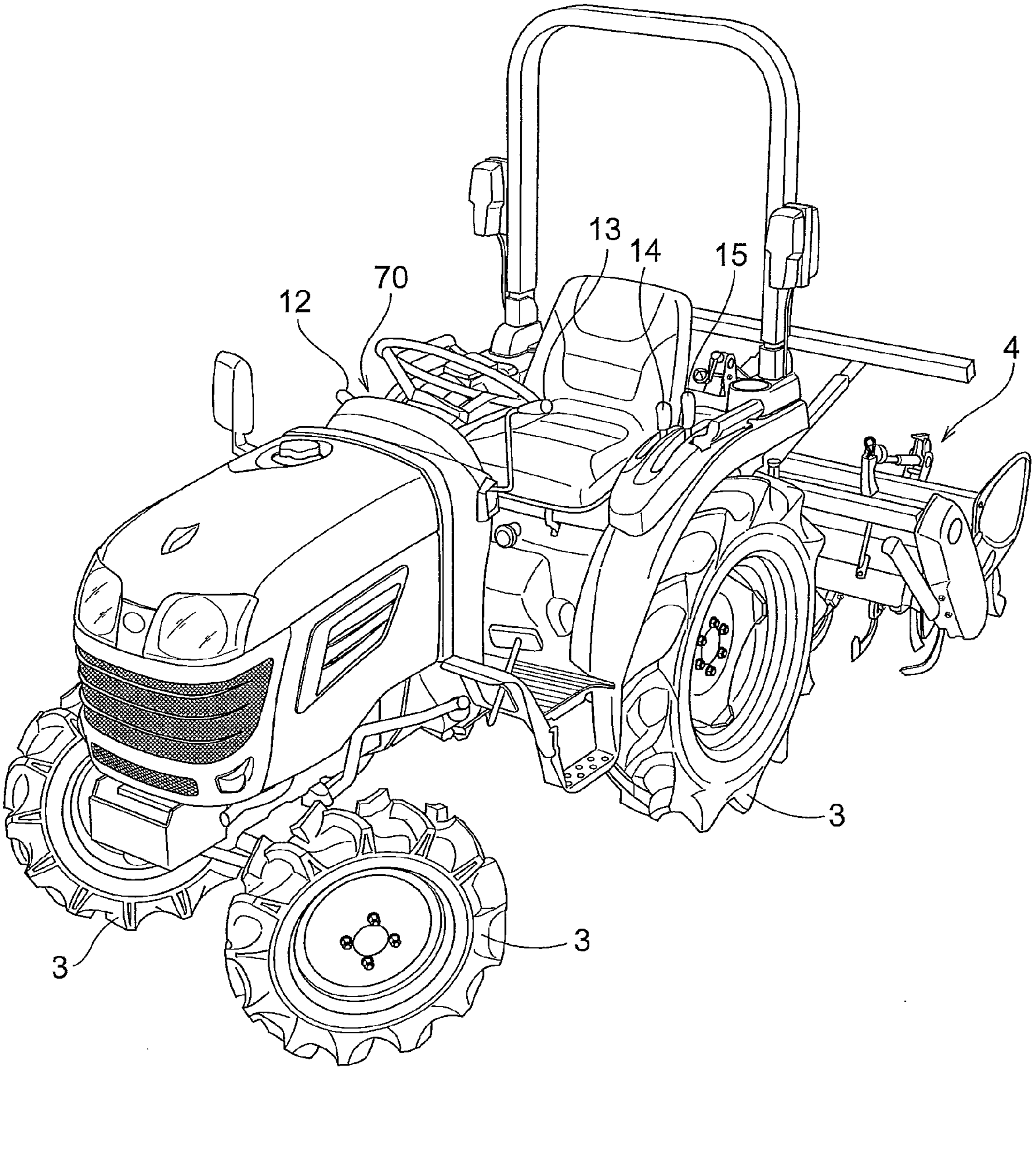
FIG. 3 is a perspective view showing a tractor mounting a condition evaluation system according to the present invention.
Figure 4:
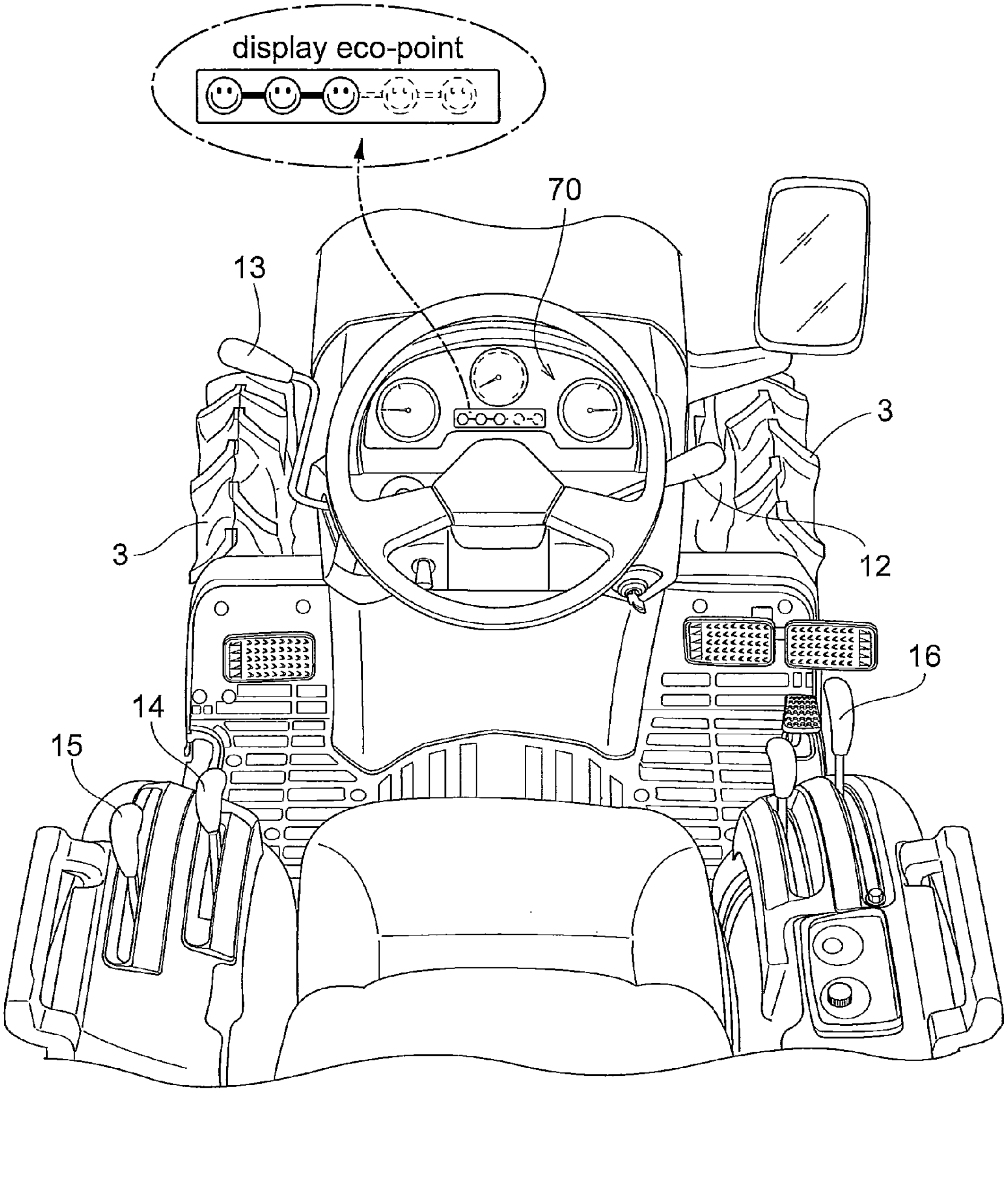
FIG. 4 is an overhead view showing a control panel area including a steering wheel provided in a driving section of the tractor.
Figure 5:
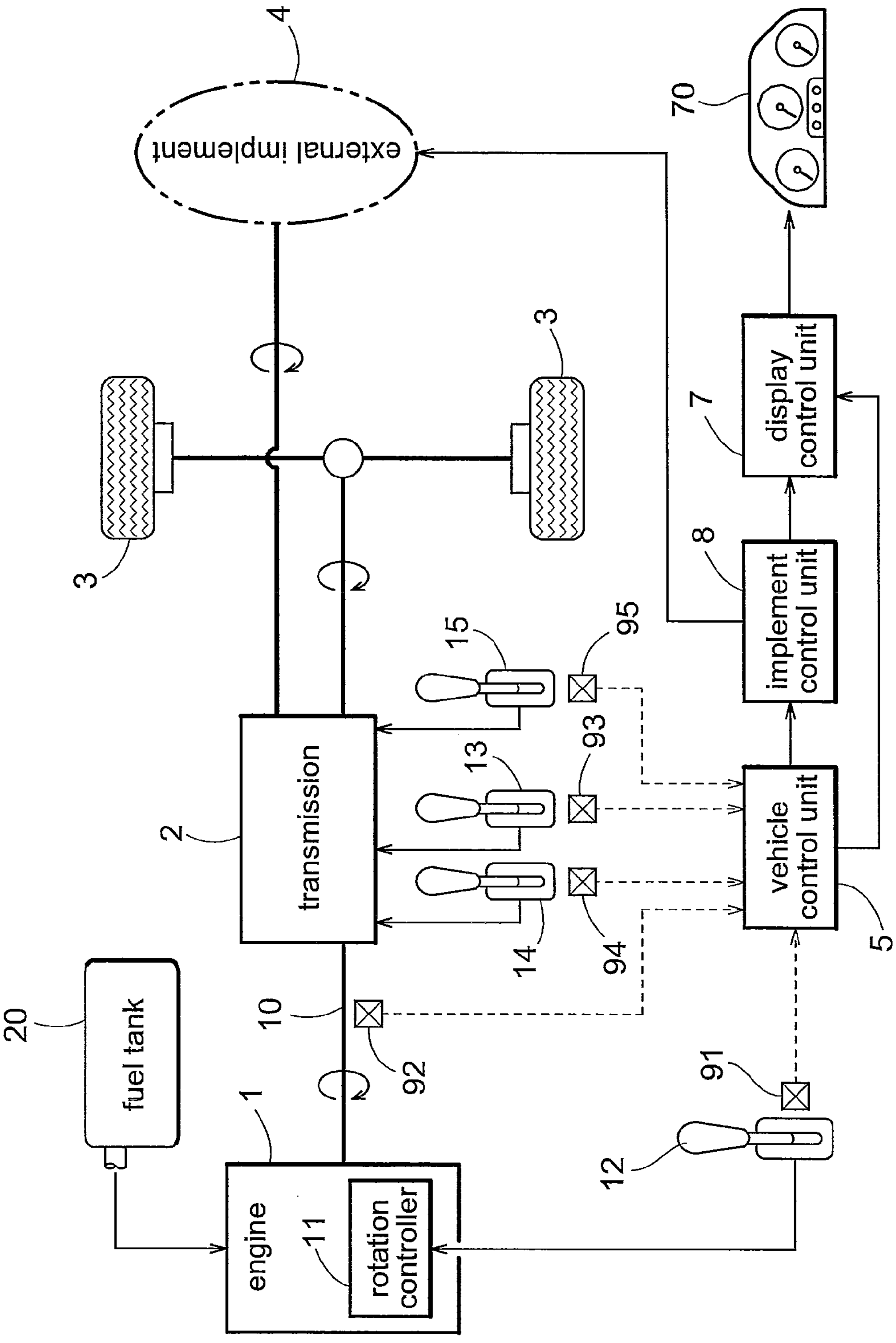
FIG. 5 is a schematic functional block diagram showing the condition evaluation system according to the present invention.

Next, there will be described a mode of embodying the fuel consumption amount evaluation system adopting the principle of the fuel injection amount calculating operation described above with reference to FIG. 1. FIG. 3 is a perspective view showing a tractor mounting this fuel consumption amount evaluation system. FIG. 4 is an overhead view showing a control panel area including a steering wheel provided in a driving section of the tractor. With this tractor, power from an output shaft 10 of an engine 1 (FIG. 5) is transmitted to drive wheels 3 via a transmission 2 (FIG. 5) and a portion of the engine power is transmitted also to an external work implement 4 such as a plowing device. This engine 1 is a diesel engine having a rotation controller 11 (FIG. 5) for adjusting the rotational speed of the engine through control of a fuel injection amount using an amount of fuel supplied from a fuel tank 20 (FIG. 5). This rotation controller 11 is configured as a mechanically operated governor type controller. Further, to this rotation controller 11, there is operably connected an accelerator lever 12 for allowing manual setting of the engine rotational speed. In accordance with an operated position of this accelerator lever 12, the change of accelerator opening degree, namely, the change of the engine rotational speed, is effected.

The fuel consumption amount evaluation system is formed and integrated substantially within a vehicle control unit 5 as an example of vehicle mounted electronic control unit. To the vehicle control unit 5, there are connected, as sensors relating in particular to the invention, an accelerator opening degree sensor 91 for detecting an operation position of the accelerator lever 12 for detecting an accelerator opening degree, and a rotational speed detecting sensor 92 for detecting a rotational speed of the engine output shaft 10 as a “measured rotational speed” of the engine 1. Information on mileage evaluated by the fuel consumption amount evaluation system is sent, as mileage information, to a display control unit 7. Then, the display control unit 7 generates, from the received mileage information, notification data in an appropriate notification form. If this notification data is a visual data, this will be sent to a display panel 70 having a liquid crystal display functioning as a monitor display, where mileage evaluation information will be displayed together with e.g. the engine rotational speed.

Figure 6:
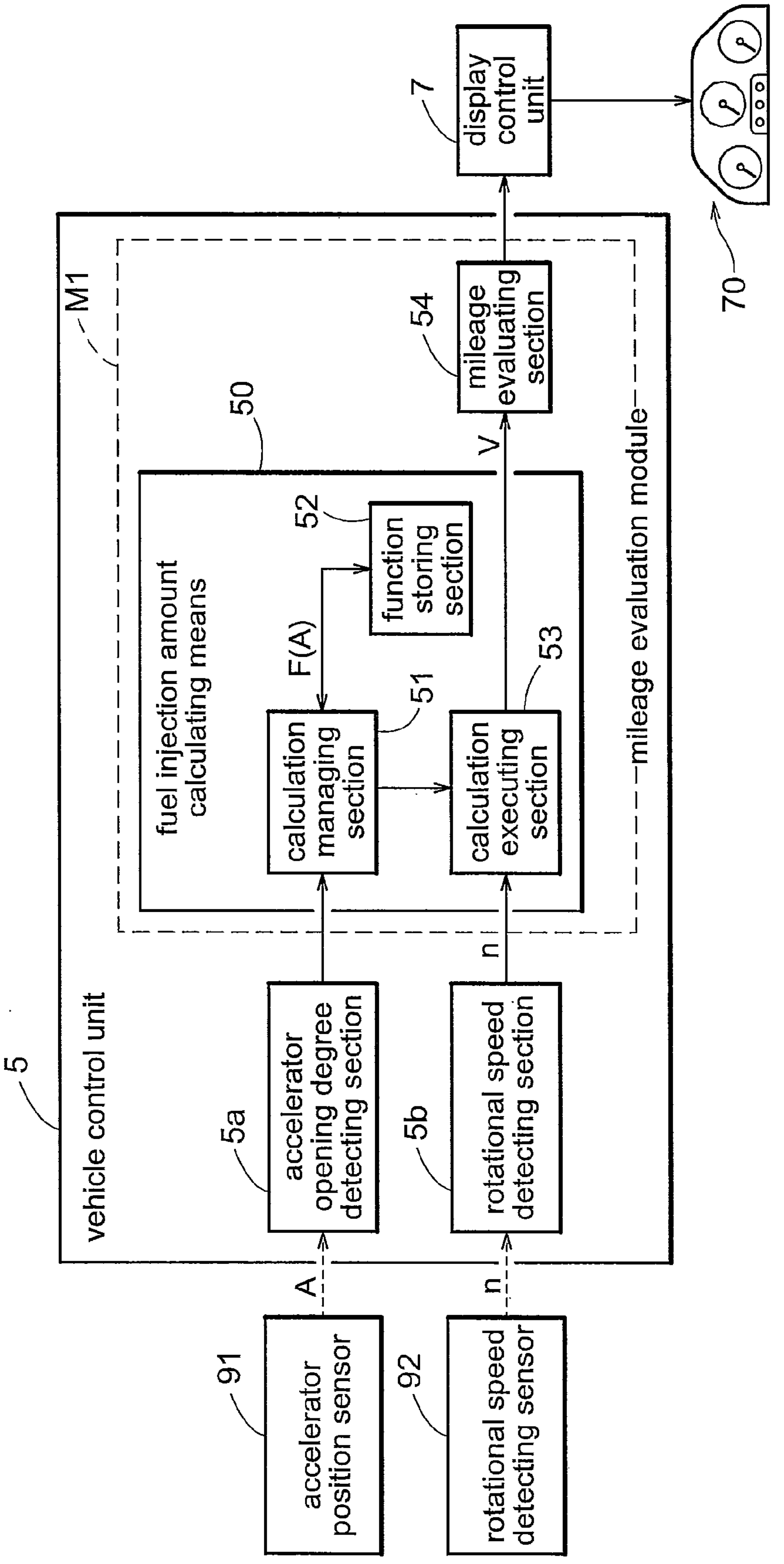
FIG. 6 is a functional block diagram showing a vehicle control unit utilized by the fuel consumption amount evaluation system as an example of the condition evaluation system relating to the present invention.

As shown in FIG. 6, to the vehicle control unit 5, there are connected, as functional sections relating in particular to the present invention, an accelerator opening degree detecting section 5*a* for detecting an accelerator opening degree, a rotational speed detecting section 5*b* for detecting a rotational speed of the engine as a measured rotational speed, a fuel injection amount calculating means 50 for calculating a fuel injection amount per predetermined unit (“unit fuel injection amount” hereinafter) in response to inputs of an accelerator opening degree and a measured rotational speed, and a mileage evaluating section 54 for effecting mileage evaluation based on the unit fuel injection amount. And, these sections are constructed of hardware and/or software. In this particular embodiment, the accelerator opening degree detecting section 5*a* detects an accelerator opening degree which affects the fuel injection amount, based on a signal from the accelerator position sensor 91, and the rotational speed detecting section 5*b* detects a measured rotational speed based on a signal from the rotational speed detecting sensor 92. Further, as a functional module relating in particular to the mileage evaluation, the fuel injection amount calculating means 50 and the mileage evaluation section 54 are integrated into a fuel evaluation module M1 as a single unit. The fuel injection amount calculating means 50 calculates the unit fuel injection amount from the accelerator opening degree and the measured rotational speed, based on a correlation prepared for each accelerator opening degree between an engine rotational speed drop amount from the reference rotational speed which is the engine rotational speed under the zero engine load condition and a change in the fuel injection amount. Incidentally, as the predetermined unit for the fuel injection amount to be calculated by the fuel injection amount calculating means 50 (i.e. the unit fuel injection amount), one rotation of the engine output shaft 10 is used preferably. However, the invention is not limited thereto.

The fuel injection amount calculating means 50 includes a calculation managing section 51 which determines the correlation between the measured rotational speed and the unit fuel injection amount and sets this determined correlation, and a calculation executing section 53 for deriving per-rotation (unit) fuel injection amount from the measured rotational speed, based on the correlation set by the calculation managing section 51. Further, in this embodiment, as the correlation between the measured rotational speed and the unit fuel injection amount, there is employed a function prepared for each accelerator opening degree in order to obtain the per-rotation (unit) fuel injection amount from the measured rotational speed. Therefore, this function prepared for each accelerator opening degree is stored in a function storing section 52. In operation, the calculation managing section 51 specifies one particular function to be used and reads this specified function from the function storing section 52 and gives this to the calculation executing section 53.

The mileage information outputted as evaluation result from the mileage evaluating section 54 which effects mileage evaluation from the fuel injection amount calculated by the fuel injection amount calculating means 50 can take various forms as follows:

(1) monitor display information of fuel consumption amount (in liters) per unit time (e.g. per an hour).

In this case, it will be advantageous to display also the vehicle speed (e.g. the average speed, speed at the time of implement work, etc.) at the same time, since this will help the driver’s grasping of the relationship between the mileage and the vehicle speed. Therefore, advantageously, the display control unit 7 will be configured to add vehicle speed information;

(2) monitor display information of traveling distance per unit fuel amount;

(3) display of eco-level according to mileage performance evaluated based on comparison with an average mileage. For instance, if the vehicle is being driven with a low fuel consumption amount, a smile mark assigned and according to its level can be displayed as an indication of good eco-driving;

(4) a voice or audio notification of the above-described mileage information and/or eco-driving information; and (5) selective notification of mileage performance (good/poor) by means of a lamp or the like.

Preferably, the mileage evaluating section 54 is configured to output any one or more in combination of the above-cited farms of mileage notification. For instance, in the case of a tractor, by seeing a speed position currently used, one can recognize whether the tractor is now traveling on a road or being engaged in a utility work with using the implement. Therefore, a display mode for mileage information suitable in particular for each case may be selected.

Figure 7:
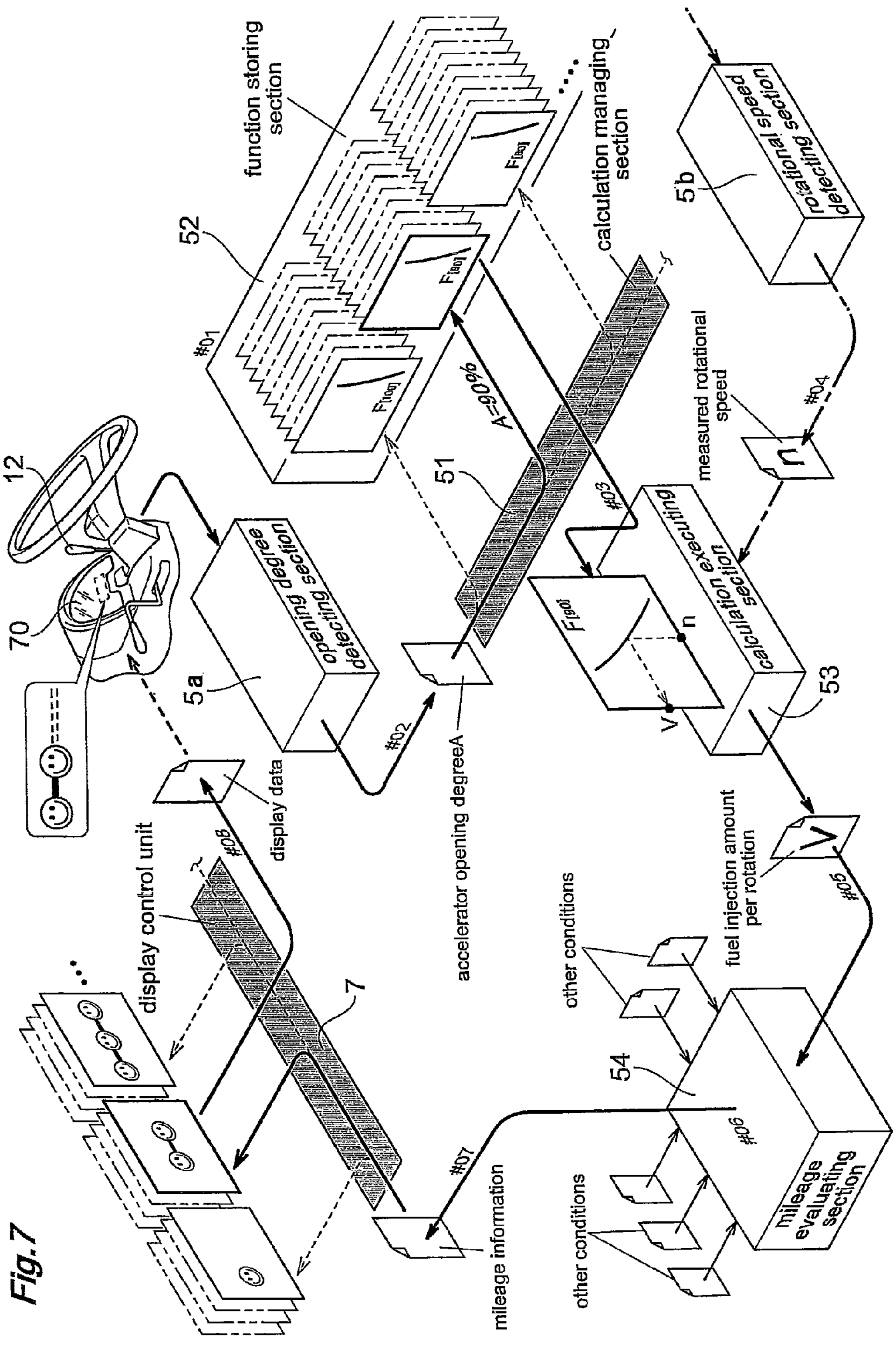
FIG. 7 is an explanatory view showing relationship between flows of control data and respective functional sections in the fuel consumption amount evaluation system.

Next, with reference to FIG. 7, there will be described a scheme of mileage evaluation in the above-described fuel consumption amount evaluation system.

With this fuel consumption amount evaluation system, by using an experimental determining method such as a bench test, there are obtained in advance such fuel injection amount characteristics curves as those described hereinbefore in the explanation of the principle of the fuel injection amount calculating process with reference to FIG. 1. Further, the system obtains in advance functions approximated to the accelerator opening degree-by-degree fuel injection characteristics curves extending from the zero-load conditions and the maximum load degree condition for the respective accelerator opening degrees, which functions constitute the fuel injection amount characteristics curves, and stores these functions in the function storing section 52 (#01). These characteristics curves can be straight lines or bent lines. Also, in case accelerator opening degree-by-degree fuel injection amount characteristics curves with smaller intervals than the intervals of the accelerator opening degrees employed in the determination are needed, this may be realized by generating approximately the fuel injection amount characteristics curves per se or the functions corresponding thereto with using the interpolation technique.

In an actual fuel consumption amount evaluation process, based on an operated position of the accelerator lever, the accelerator opening degree detecting section 5*a* determines an accelerator opening degree: A and forwards this to the calculation managing section 51 (#02). Upon receipt of this accelerator opening degree: A, the calculation managing section 51 retrieves a function suited to the value this accelerator opening degree: A, in this case, the function F [90], from the function storing section 52, since A=90% and sets this in the calculation executing section 63 (#03). Further, the rotational speed detecting section 5*b* determines a measured rotational speed: n, which is the rotational speed of the engine output shaft 10 and forwards this to the calculation executing section 53 (#04). The calculation executing section 53 gives the measured rotational speed: n to the set function F [90] and then calculates a per-rotation fuel injection amount: V from the expression: V=F [90](n) and inputs the result to the mileage evaluation section 54 as a judgment condition of mileage evaluation (#05). The mileage evaluation section 54 inputs, as judgment conditions, a vehicle speed, a speed position, an implement operational condition, etc. when needed, in addition to the per-rotation fuel injection amount.

Then, upon inputs of the judgment condition such as the per-rotation fuel injection amount, the mileage evaluating section 54 evaluates the mileage and generates mileage information described above (#06). If the generated mileage information is for use in monitor display, this mileage information is sent to the display control unit 7 (#07). Based on this sent mileage information, the display control unit 7 generates display data to be displayed as a suitable image on the liquid crystal display section of the display panel 70 and outputs this data (#08). In the example shown in FIG. 7, the image displayed on the display panel 70 is a combination of horizontal bars and smile marks that increase in number with improvement of mileage. With this displaying, it is possible to urge the driver to effect or observe energy-saving drive (eco-drive).

Embodiment 2

There will be described by way of an embodiment thereof, the vehicle driving evaluation system implementing the principle of the engine load degree calculating process described hereinbefore with reference to FIG. 2.

As shown in FIG. 3 and FIG. 4, speed changing operations to the transmission 2 are effected via various kinds of control levers provided in the driver's section. In this embodiment, for speed changing operations in multiple speed positions in the traveling line, there are provided a main speed changing lever 13 and an auxiliary speed changing lever 14 for switching over between two, high and low speed positions. Further, for two-speed position changing operations for the PTO line for transmitting power to the work implement 4, there is provided a PTO speed changing lever 15. And, in the driver's section, there is also provided an implement lift control lever 16 for lifting up/down the work implement 4 such as a plowing device mounted via a lift mechanism.

Figure 8:
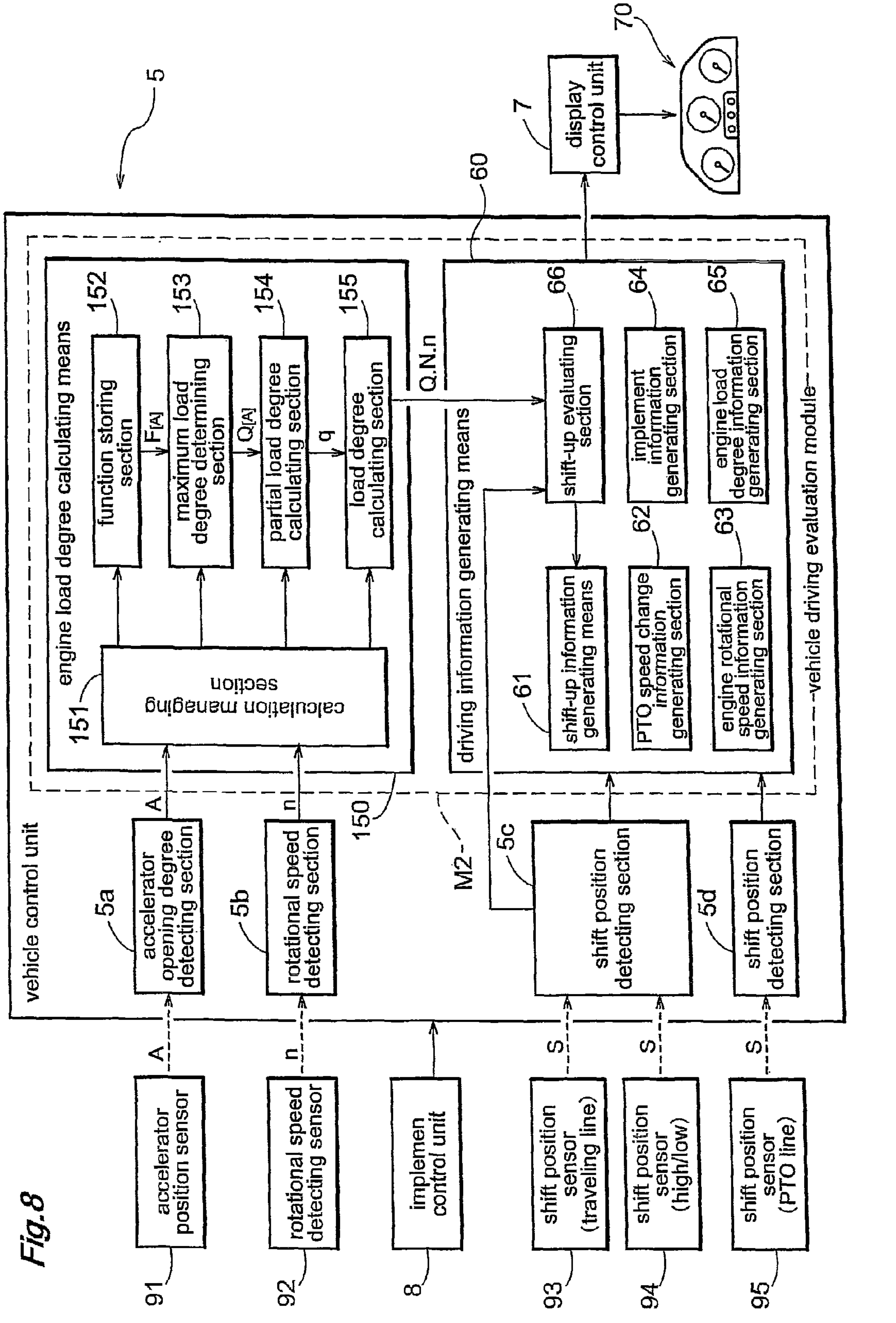
FIG. 8 is a functional block diagram of functional sections of the vehicle control unit utilized in a vehicle driving evaluation system as an example of the condition evaluation system relating to the present invention.

As shown in FIG. 8, the vehicle driving evaluation system is constructed substantially within the vehicle control unit 5 as an example of a vehicle mounted electronic control unit. To the vehicle control unit 5, there are connected, as sensors relating in particular to the present invention, an accelerator position sensor 91 for detecting an operated position of the accelerator lever 12 in order to detect an accelerator opening degree, a rotational speed detecting sensor 92 for detecting a rotational speed of the engine output shaft 10 as a measured rotational speed of the engine 1, a main speed changing lever shift position detecting sensor 93 for detecting a shifted position of the main speed changing lever 13, an auxiliary speed changing lever shift position detecting sensor 94 for detecting a shifted position of the auxiliary speed changing lever 14, and a PTO speed changing lever shift position detecting sensor 95 for detecting a shifted position of the PTO speed changing lever 15. Information about driving evaluated by the vehicle driving evaluation system is sent as driving information to the display control unit 7. From this received driving information, the display control unit 7 generates notification data in a suitable form of notification. If this notification data is visual data, this is sent to the display panel 70, which displays driving information such as the shift operation information, an engine rotational speed, etc. Further, the vehicle control unit 5 and the display control unit 7, including the implement control unit 8 for managing the control of the implement 4, are connected to each other via a vehicle mounted LAN so as to be capable of transmitting/receiving data therebetween.

The vehicle control unit 5 includes, as input functional sections relating in particular to the present invention, an accelerator opening degree detecting section 5*a* for detecting an accelerator opening degree, a rotational speed detecting section 5*b* for detecting an engine rotational speed as a measured rotational speed, a shift position detecting section 5*c* for detecting a shifted condition of the traveling line, and a shift position detecting section 5*d* for detecting a shifted position of the PTO line. Further, the vehicle control unit 5 includes, as data processing functional sections, an engine load degree calculating means 150 for calculating an engine load degree from a partial load degree calculated from the measured rotational speed and a maximum load degree for each accelerator opening degree, based on the correlation prepared for each accelerator opening degree between an engine rotational speed drop amount from the reference rotational speed which is the rotational speed under the engine zero-load condition and a torque change; and a driving information generating means 60 for generating appropriate driving information for this vehicle based on the engine load degree calculated by the engine load degree calculating means 150. The vehicle control unit 5 further includes a shift-up evaluating section 66 for determining possibility (advisability) of a shift-up operation based on the calculated engine load degree and the detected shifted position. These functional sections provided in the vehicle control unit 5 are constructed of hardware and/or software.

In this embodiment, the accelerator opening degree detecting section 5*a* detects an accelerator opening degree that affects the fuel injection amount, based on a signal from the accelerator position sensor 91. The rotational speed detecting section 5*b* detects a measured rotational speed, based on a signal from the rotational speed detecting sensor 92. The shift position detecting section 5*c* is capable of detecting a shifted position of the main speed changing lever 13 based on a signal from the main speed changing lever shift position detecting sensor 93 and capable also of detecting a shifted position of the auxiliary speed changing lever 14 based on a signal from the auxiliary speed changing lever shift position detecting sensor 94. The shift position detecting section 5*c* is capable also of grasping the speed changing ratio of the traveling line as a whole. Then, the shifted positions detected by the shift position detecting section 5*c* are sent, as current shift position information of the traveling line, to the shift-up evaluating section 66 as basic information for use in evaluating whether a shift-up operation is possible or not. Further, the shift position detecting section 5*d* is capable of detecting a shifted position of the PTO speed changing lever 15 based on a signal from the PTO speed changing lever shift position detecting sensor 95.

The engine load degree calculating means 150 includes a maximum load degree calculating section 153 for determining a maximum load degree based on an accelerator opening degree sent from the accelerator opening degree detecting section 5*a*; a partial load degree calculating section 154 for calculating a partial load degree from a measured rotational speed based on the correlation stored in a function storing section 152 (in this case, the function: F [A]) which is specified by the accelerator opening degree; a load degree calculating section 155 for calculating an engine load degree from the maximum load degree and the partial load degree; and a calculation managing section 151 for managing transmission of data to the respective functional sections and processing at these respective functional sections. The function F[A] stored in the function storing section 152 is a function which differs for each accelerator opening degree and which inputs the measured rotational speed as a variable input and outputs a partial load degree. More particularly, the accelerator opening degree-by-degree function employed in this embodiment is a complex function composed of combination of linear functions defined for respective domains and has a form such as that of a bent or broken line graph. Incidentally, as may be apparent from FIG. 2 (*c*), the maximum value of the engine rotational speed provided by this function: F[A] is the reference rotational speed: N and the maximum value of the load degree provided by this function: F[A] is the maximum load degree: Q[A].

The shift-up evaluating section 66 provided as a constituent element of the driving information generating means 60 has a function of that of a rule base which uses the engine load degree as a primary decision condition thereof and outputs decision of whether the currently speed shift position, in particular, in the light of eco-driving, is appropriate or not and whether a shift-up operation is possible or not. For instance, as described above with reference to FIG. 2, as a simplified rule base, it is conceivable to employ a shift-up evaluation expression: G which inputs values of the engine load degree: P, the reference rotational speed: N, the measured rotational speed: n, the current shift position (speed position): S and outputs a value of either 1 for indicating shift-up being possible or 0 for indicating shift-up being not possible.

The driving information generating means 60 includes a variety of information generating sections in order to generate various kinds of information relating to vehicle control and in accordance with the contents of such information. Of these sections, the sections relating in particular to the present invention include e.g. a shift-up information generating section 61 for generating information for effecting a notification for prompting a shift-up operation of the traveling line based upon the shift-up evaluation result from the shift-up evaluating section 66; a PTO speed changing information generating section 62 for generating information for effecting a notification for prompting a shift-up operation of the PTO line based upon the shift-up evaluation result from the shift-up evaluating section 66; an engine rotational speed information generating section 63 for generating information for notifying an engine rotational speed; an implement information generating section 64 for generating information for notifying e.g. operation advice for the implement; and an engine load degree information generating section 65 for generating information of effecting a notification of an engine load ratio obtained by the engine load degree calculating means 150.

As described above, in this Embodiment 2, as the functional sections relating in particular to the vehicle driving evaluation, the engine load degree calculating means 150 and the driving information generating means 60 including the shift-up evaluating section 66 are integrated together into a module, i.e. a vehicle driving evaluating module M2.

Figure 9:
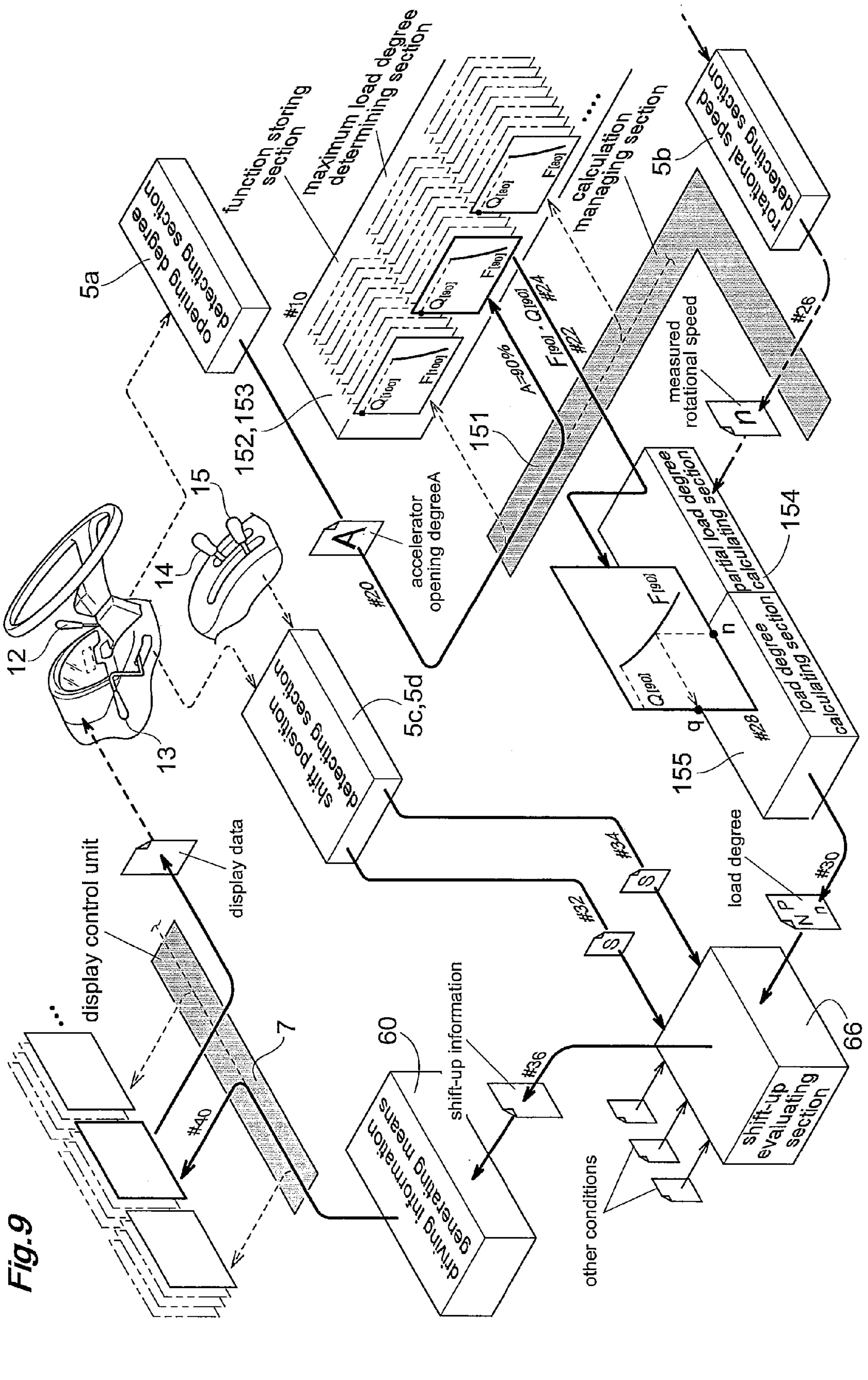
FIG. 9 is an explanatory view illustrating relationships between flows of control data and respective functional sections in the vehicle driving evaluation system.
Figure 10:
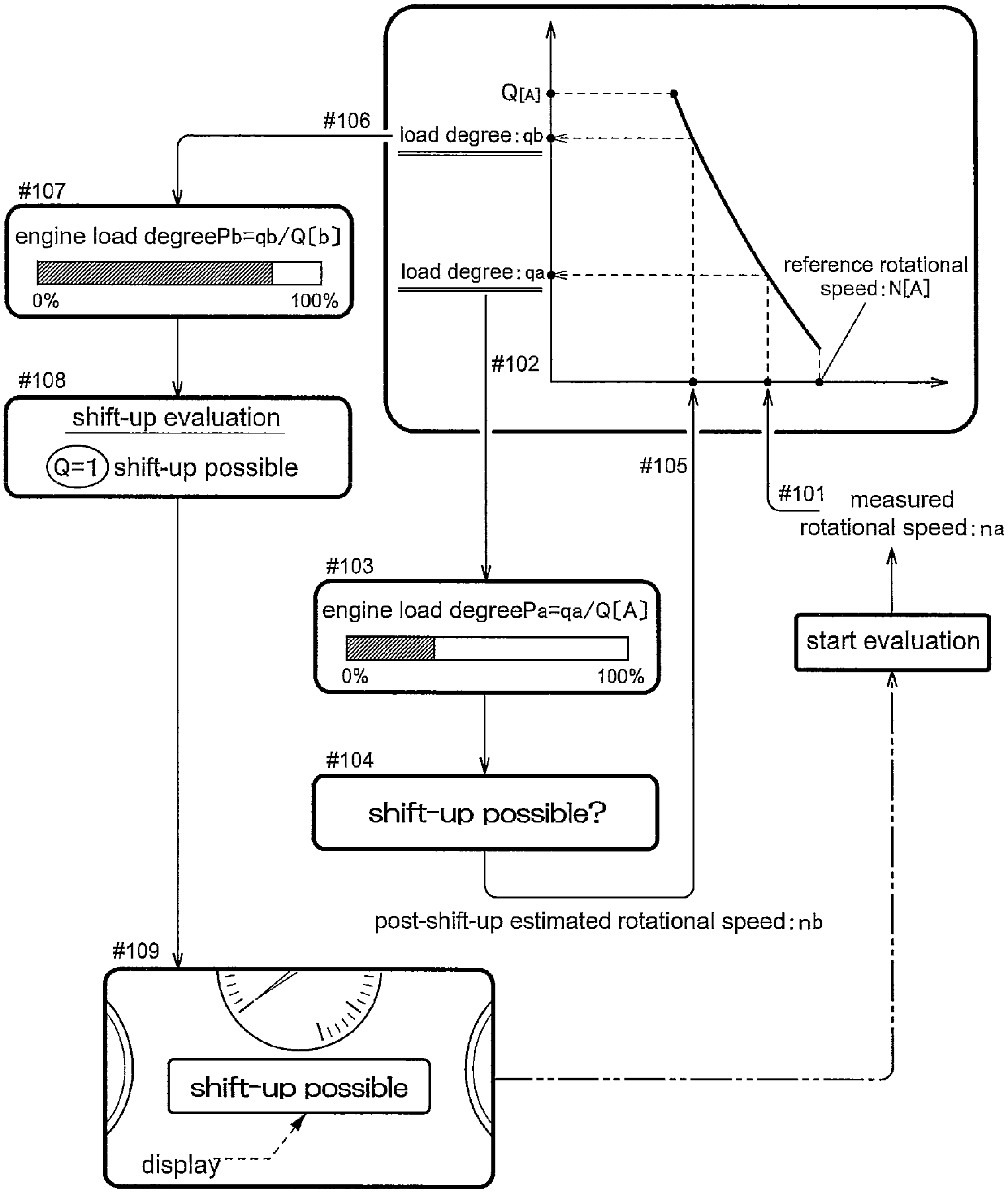
FIG. 10 is an explanatory view schematically illustrating one approach for evaluating possibility of shift-up operation.

Next, with reference to FIGS. 9 and 10, there will be described a scheme of driving information displaying in the vehicle driving evaluation system described above.

With this vehicle driving evaluation system, by using an experimental determining technique such as a bench test, there are obtained in advance torque characteristics curves that are to be eventually converted into such load degree characteristics curves as those described hereinbefore in the explanation of the principle of the engine load degree calculating process with reference to FIG. 2. Further, the system obtains in advance functions approximated to the accelerator opening degree-by-degree fuel injection characteristics curves extending from the zero-load conditions and the maximum load degree condition for the respective accelerator opening degrees, which functions constitute the load degree characteristics curves, and stores these functions in the function storing section 152 (#10). These characteristics curves can be straight lines, or bent or broken lines. Also, in case accelerator opening degree-by-degree load degree characteristics curves with smaller intervals than the intervals of the accelerator opening degrees employed in the determination are needed, this may be realized by generating approximately the load degree characteristics curves per se or the functions corresponding thereto with using the interpolation technique.

In the following discussion, shift-up information will be used as an example of driving information taking engine load degree into consideration.

In the process of calculating an engine load degree, based on an operated position of the accelerator lever 12, the accelerator opening degree detecting section 5*a* determines an accelerator opening degree: A and forwards this to a calculation managing section 151 (#20). Upon receipt of this accelerator opening degree: A, the calculation managing section 151 retrieves a function suited to the value of this accelerator opening degree: A (in this case, the function F [90]) from the function storing section 152, since A=90%; and sets this in a load degree calculating section 154 (#22). Simultaneously therewith, the maximum load degree: Q[90] for A=90% is read from the maximum load degree determining section 153 and this is set to a load degree calculating section 155 (#24). That is, the maximum load degree determining section 153 functions as a table for providing a maximum load degree according to an accelerator opening degree.

Further, the rotational speed detecting section 5*b* determines a measured rotational speed: n, which is the rotational speed of the engine output shaft 10 and forwards this to the partial load degree calculating section 154 (#26). The partial load degree calculating section 154 gives the measured rotational speed: n to the set function F [90] and then calculates a partial load degree: q from the expression: q=F [90](n) and inputs the result to the load degree calculating section 155 (#28). The load degree calculating section 155 calculates an engine load degree: P from a ratio between the partial load degree: q and the maximum load degree: Q [90] and forwards the result as evaluation judgment condition to the shift-up evaluating section 90 (#30). In this, in the case of this embodiment, not only the engine load degree: P, but also the measured rotational speed: n and the reference rotational speed: N[90] will be added. For instance, a change over time of the measured rotational speed: n can be an important judgment condition relating to the shift-up evaluation.

Needless to say, for shift-up evaluation, the current shift position (speed position) is needed as the reference. Therefore, the shift-up evaluating section 66 inputs the shift position of the main speed changing lever 13 and the shift position of the auxiliary speed changing lever 14 from the shift position detecting section 5*c* (#32). Simultaneously, if shift-up information of the PTO line too is to be notified, the shift position of the PTO speed changing lever 15 will be inputted form the shift position detecting section 5*d* (#34). Further, to the shift-up evaluating section 66, a vehicle speed, a speed position, an implement operational condition, etc. may be inputted as judgment conditions, in addition to the above, when needed.

The shift-up evaluating section 66 has a function similar to a rule base that outputs whether the current speed shift position is appropriate in particular for the eco-driving or whether a shift-up operation is possible or not, with using the engine load degree as the main judgment condition. Instead, it is also possible to employ a technique of inferential calculation as follows.

An example of such inferential calculation that can be adopted by the shift-up evaluating section 66 will be described next with reference to the diagram in FIG. 10. In this example, let us assume that the accelerator opening degree: A is 90(%), the function: F[90] is set to the partial load degree calculating section 154, and the maximum load degree: Q [90] is set to the load degree calculating section 155.

First, prior to initiation of shift-up evaluation, a measured rotational speed: na is obtained (#101) and this is given to the expression: q=F [90], whereby a load degree (determined and calculated partial load degree): qa is derived therefrom (#102). Then, from this determined calculated load degree: qa and the maximum load degree: Q[90], an engine load degree: Pa is calculated (#103). An engine rotational speed after shift-up operation is inferred from the calculated engine load degree: Pa, in order to determine whether a shift-up operation is possible (#104) and this inferred engine rotational speed: nb is given to the expression: q=F [90] (#105), whereby a load degree after the shift-up operation (inferentially calculated partial load degree): qb is derived therefrom (#106).

Further, from this inferentially calculated partial load degree: qb and the maximum load degree: Q[90], an engine load degree: Pb is calculated (#107). Then, the process checks the possibility of a problem such as engine stall, as being judged from calculated post-shift-up engine load degree: Pb, and judges if a shift-up operation is possible (#108). If the process judges that a shift-up operation is possible, then, the display panel 70 displays a message prompting appropriate (eco) driving, namely, "Shift-up possible" as appropriate driving information (#109).

In this case, the shift-up information as evaluation result provided by the shift-up evaluating section 66 configured to evaluate possibility/impossibility of shift-up operation as a driving evaluating section is forwarded to the driving information generating means 60 (#36). Then, based on this shift-up information obtained, the driving information generating means 60 generates appropriate driving information for effecting visual or audio (voice) notification. For instance, if appropriate driving information for displaying as visual notification is sent to the display control unit 7, the display control unit 7 will select a display message corresponding to this appropriate driving information for displaying and outputs this as display data to the display panel 70 (#40).

Figure 11:
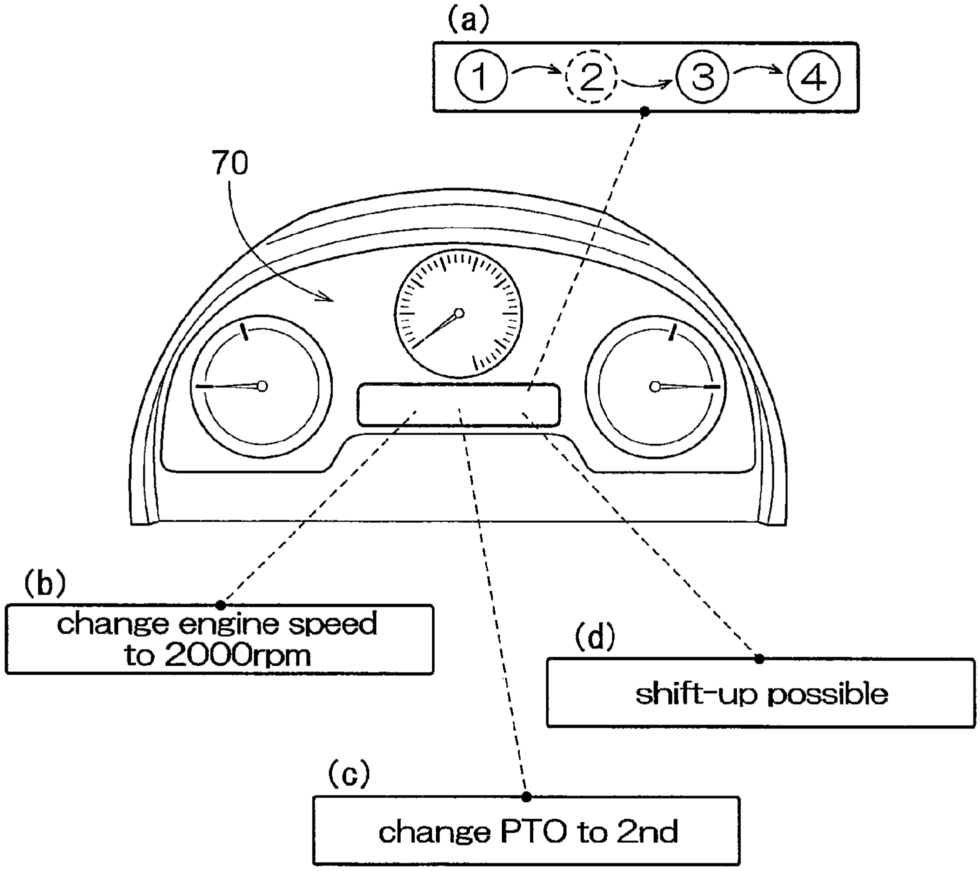
FIG. 11 is a display screen view showing an example of driving information to be displayed on a liquid crystal display of a display panel.

The contents that are generated by the driving information generating means 60 with reference to the driving evaluation result based on an engine load degree and that are to be notified via e.g. the display panel 70 include various kinds of contents designed for prompting appropriate driving. One example thereof is illustrated in FIG. 11. FIG. 11 (*a*) shows a graphic message prompting a shift-up operation. Though may be somewhat difficult to see in this illustration, the current shift position is "first speed" and a mark "2" is flickered for prompting a shift-up operation to the second speed. FIG. 11 (*b*) shows a character message: "Change engine rotational speed to 2000 rpm." in order to prompt a change of the engine rotational speed to an appropriate rotational speed. FIG. 11 (*c*) shows a character message: "Change PTO to second speed." in order to prompt a speed change in the PTO line. To this end, the shift-up evaluating section 66 employs, as the judgment conditions, shift position of the PTO speed changing lever 15 and operational condition information of the implement 4 also. In FIG. 11 (*d*), similarly to FIG. 11 (*a*), a character message, rather than a graphic image, is employed.

Embodiment 3

Figure 12:
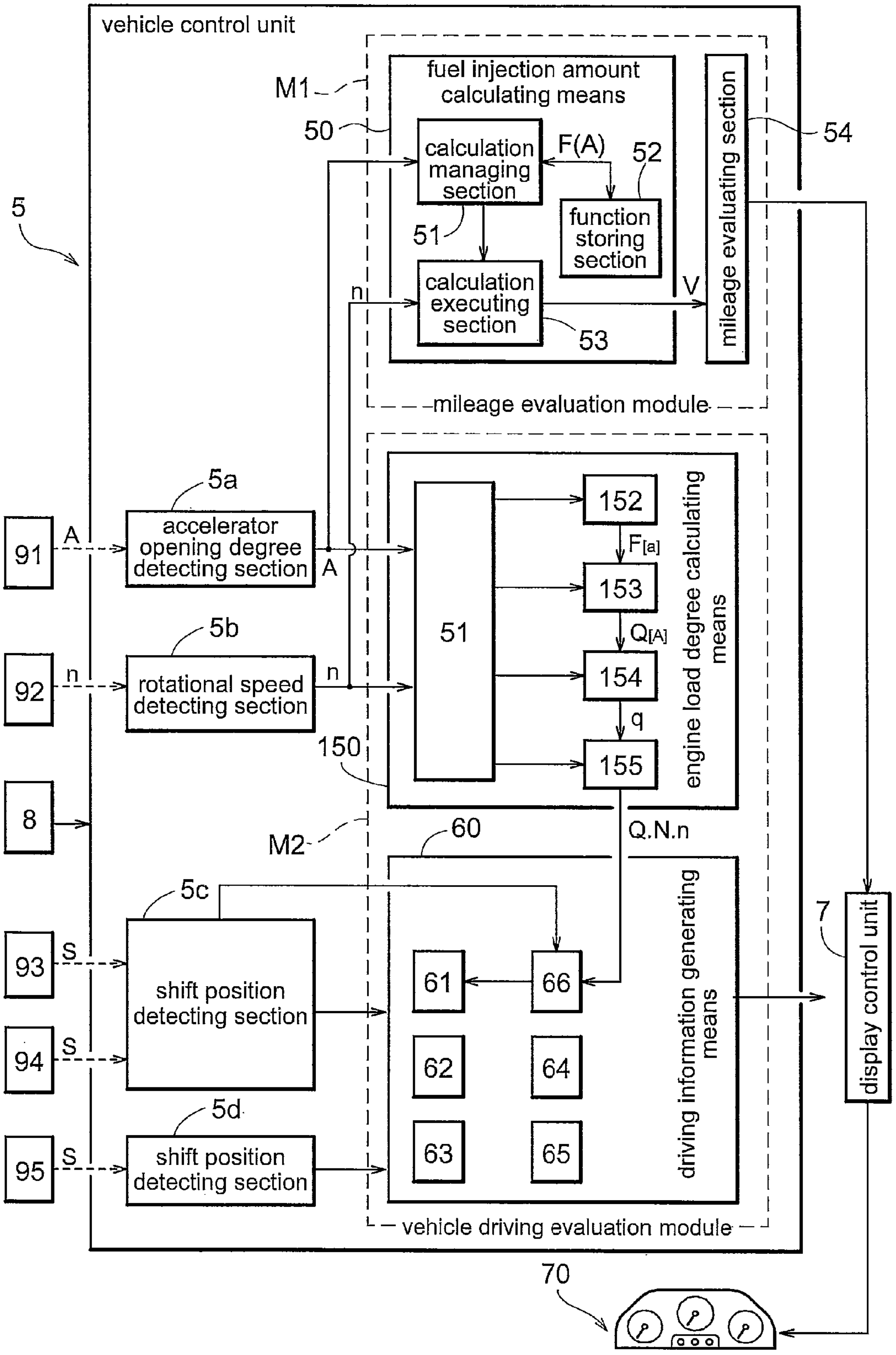
FIG. 12 is a functional block diagram of a vehicle control unit incorporating the fuel consumption amount evaluation system and the vehicle driving evaluation system.
Figure 13:
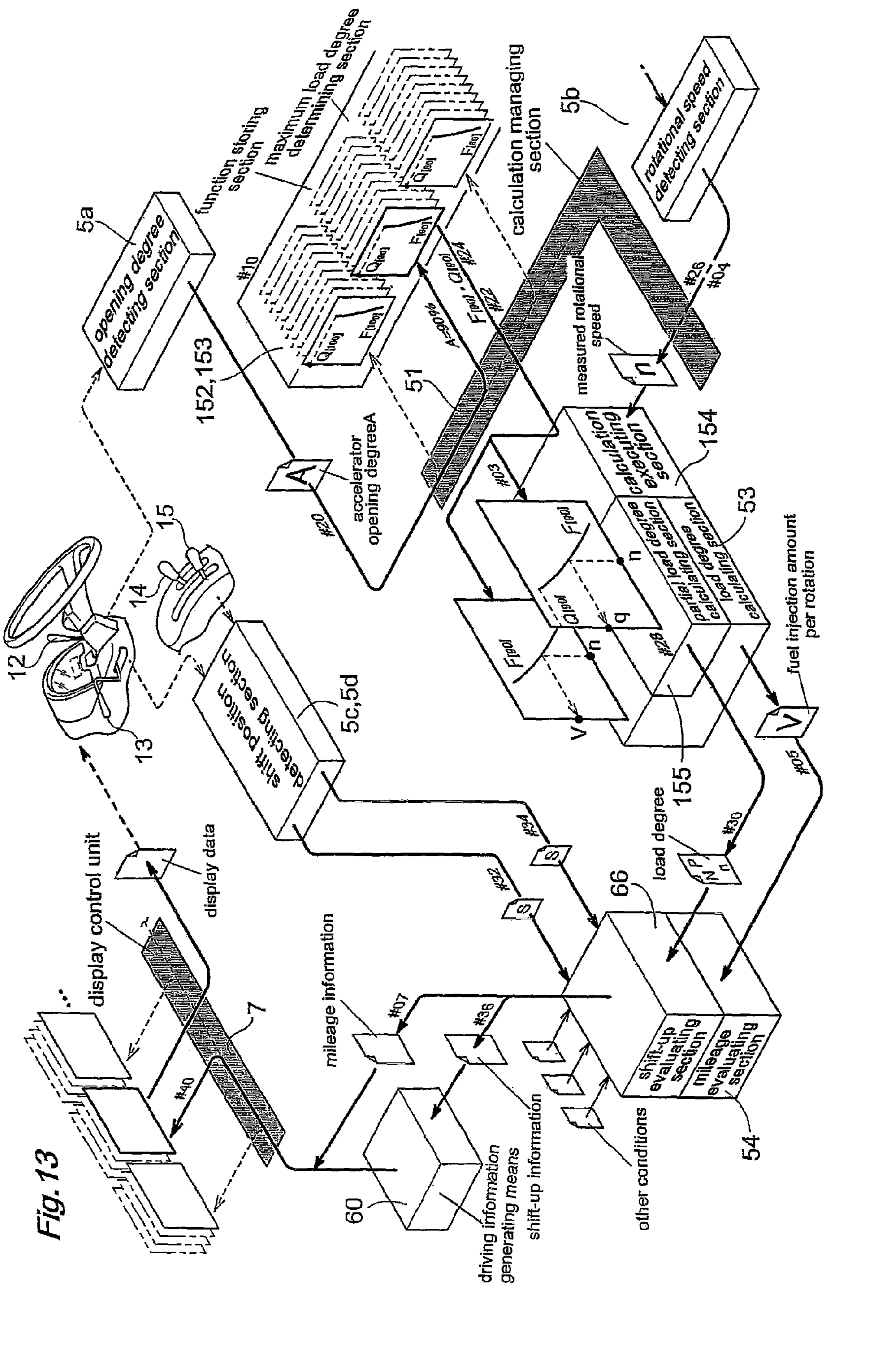
FIG. 13 is a diagram illustrating the principle of a fuel injection amount calculating operation and an engine load degree calculating operation integrated together.

Embodiment 3 concerns a condition evaluation system combining Embodiment 1 and Embodiment 2 described above. This system incorporates the mileage evaluation module M1 and the vehicle driving evaluation module M2. The functional block diagram of this system is shown in FIG. 12 and FIG. 13 shows a schematic diagram illustrating the fuel injection amount calculating process and an engine load degree calculating process integrated together. For explanation of this condition evaluation system, the foregoing explanations separately for the fuel injection amount calculating process and the engine load degree calculating process can apply.

Other Embodiments

The present invention may be further embodied as follows, in addition to the foregoing embodiments.

(1) In the foregoing embodiments, as a correlation that can be produced by determining an engine rotational speed drop amount from the reference rotational speed which is the engine rotational speed under the zero engine load condition and the associated change in the fuel injection amount, for each accelerator opening degree, a measured rotational speed/fuel injection amount function is prepared and stored in advance in the function storing section 52. Instead of such measured rotational speed/fuel injection amount function for each accelerator opening degree, it is possible to prepare, as the above-described correlation, a lookup table from which a per-rotation fuel injection amount can be read from a measured rotational speed and an accelerator opening degree can be incorporated within the fuel injection amount calculating means 50. Namely, in this further embodiment, the function storing section 52 is configured to function as a table that inputs a measured rotational speed and an accelerator opening degree and outputs a per-rotation fuel injection amount.

In the meantime, instead of preparing the above-described correlation by determining an engine rotational speed drop amount from a reference rotational speed which is the engine rotational speed under the zero engine load condition and the associated change in the fuel injection amount, the measured rotational speed/fuel injection amount curves for respective accelerator opening degrees representing the correlations between measured rotational speeds and fuel injection amounts can be prepared alternatively by such adjustment operations as parallel translation or rotation of an engine performance curve obtained by determining an engine rotational speed drop amount from a reference rotational speed which is the engine rotational speed under the zero engine load condition and the associated change in the torque.

(2) In the foregoing embodiments, the accelerator opening degree detecting section 5*a* determines an accelerator position based on the signal from the accelerator position sensor 91. Instead, an alternative arrangement of determining an accelerator position based on a signal from a different sensor disposed at various positions or a further alternative arrangement wherein an accelerator opening degree determined by a different ECU is given directly to the fuel injection amount calculating means 50 will also be possible. Similarly, in the foregoing embodiments, the rotational speed detecting section 5*b* determines a measured rotational speed based on the signal from the rotational speed detecting sensor 92 which detects the rotational speed of the engine output shaft 10. Instead, an alternative arrangement of determining a measured rotational speed based on a signal from a different sensor disposed at various positions or a further alternative arrangement wherein an engine rotational speed determined by a different ECU is given directly to the fuel injection amount calculating means 50 will also be possible.

(3) In the foregoing embodiment, the mileage evaluating section 54 inputs a per-rotation fuel injection amount as a judgment condition and generates and outputs mileage information based on a preset rule. Instead of this, an alternative arrangement of simply outputting such per-rotation fuel injection amount as the mileage information or an alternative arrangement wherein chronological change or behavior of the per-rotation fuel injection amount is statistically processed and the result of this process is outputted as the mileage information will also be possible.

(4) In the foregoing embodiments, as a correlation that can be produced by determining an engine rotational speed drop amount from the reference rotational speed which is the engine rotational speed under the zero engine load condition and the associated change in the torque, for each accelerator opening degree, a measured rotational speed/load degree function is prepared and stored in advance in the function storing section 152. Instead of such measured rotational speed/load degree function for each accelerator opening degree, it is possible to prepare, as the above-described correlation, a lookup table from which a load degree can be read from a measured rotational speed and an accelerator opening degree can be incorporated within the engine load degree calculating means 150. Namely, in this further embodiment, the function storing section 152 is configured to function as a table that inputs a measured rotational speed and an accelerator opening degree and outputs a load degree.

(5) In the foregoing embodiments, the accelerator opening degree detecting section 5*a* determines an accelerator position based on the signal from the accelerator position sensor 91. Instead, an alternative arrangement of determining an accelerator position based on a signal from a different sensor disposed at various positions or a further alternative arrangement wherein an accelerator opening degree determined by a different ECU is given directly to the engine load degree calculating means 150 will also be possible. Similarly, in the foregoing embodiments, the rotational speed detecting section 5*b* determines a measured rotational speed based on the signal from the rotational speed detecting sensor 92 which detects the rotational speed of the engine output shaft 10. Instead, an alternative arrangement of determining a measured rotational speed based on a signal from a different sensor disposed at various positions or a further alternative arrangement wherein an engine rotational speed determined by a different ECU is given directly to the engine load degree calculating means 150 will also be possible.

What is claimed is:

1. A condition evaluation system for an engine-driven traveling vehicle, comprising:

a rotational speed detecting section for detecting an engine rotational speed of the engine-driven traveling vehicle as a measured rotational speed;

an accelerator opening degree detecting section for detecting an accelerator opening degree;

a storing section for storing, as a correlation group, a correlation prepared for each accelerator opening degree between an engine rotational speed drop amount from a reference rotational speed which is the engine rotational speed under a zero load condition of the engine and a change in fuel injection amount;

a fuel injection amount calculating means for selecting, from the correlation group, the correlation associated with the accelerator opening degree detected by the accelerator opening degree detecting section, and applying, to the selected correlation, the measured rotational speed detected by the rotational speed detecting section to calculate a fuel injection amount per predetermined unit; and a mileage evaluating section for effecting a mileage evaluation based on the fuel injection amount calculated by the fuel injection amount calculating means.

2. The condition evaluation system according to claim 1, wherein said fuel injection amount calculating means includes:

a calculation managing section for setting the selected correlation; and a calculation executing section for deriving the fuel injection amount from the measured rotational speed, based on the correlation set by the calculating managing section.

3. The condition evaluation system according to claim 2, wherein said correlation group is used as an accelerator opening degree-by-degree function for outputting a fuel injection amount per rotation of the engine as said fuel injection amount in response to input of said measured rotational speed, and said accelerator opening degree-by-degree function is generated and stored, into the storing section, in advance for each predetermined accelerator opening degree.

4. The condition evaluation system according to claim 2, wherein an accelerator opening degree-by-degree function comprises a combination of linear functions defined respectively for a plurality of domains.

5. The condition evaluation system according to claim 1, wherein said engine-driven traveling vehicle is a work vehicle mounting an engine-driven utility implement, and said mileage evaluating section uses an operational condition of the implement as a judgment condition for a rule of the mileage evaluation, in addition to the fuel injection amount.

6. The condition evaluation system according to claim 1, wherein information on the mileage evaluation by the mileage evaluating section is displayed on a display panel, together with vehicle speed information of the engine-driven traveling vehicle.

7. A condition evaluation system for an engine-driven traveling vehicle, comprising:

an engine rotational speed detecting section for detecting an engine rotational speed of the engine-driven traveling vehicle as a measured engine rotational speed;

an accelerator opening degree detecting section for detecting an accelerator opening degree;

a storing section for storing, as a correlation group, a correlation prepared for each accelerator opening degree between an engine rotational speed drop amount from a reference rotational speed which is the engine rotational speed under a zero load condition of the engine and an engine load degree;

an engine load degree calculating means for selecting, from the correlation group, the correlation associated with the accelerator opening degree detected by the accelerator opening degree detecting section, and applying, to the selected correlation, the measured rotational speed detected by the rotational speed detecting section to calculate a partial load degree and a maximum load degree for each accelerator opening degree; and a driving information generating means for evaluating a driving condition of the vehicle based on said engine load degree calculated by said engine load degree calculating means, and generating appropriate driving information for the vehicle.

8. The condition evaluation system according to claim 7, wherein said engine load degree calculating means includes:

a maximum load degree determining section for determining the maximum load degree according to the accelerator opening degree detected by the accelerator opening degree detecting section;

a partial load degree calculating section for calculating the partial load from the measured rotational speed based on the selected correlation; and a load degree calculating section for calculating the engine load degree from the maximum load degree and the partial load degree.

9. The condition evaluation system according to claim 7, wherein said correlation group comprises an accelerator opening degree-by-degree function that outputs said partial load degree in response to a variable input of said measured rotational speed.

10. The condition evaluation system according to claim 9, wherein an accelerator opening degree-by-degree function comprises a combination of linear functions defined respectively for a plurality of domains.

11. The condition evaluation system according to claim 7, further comprising a shift position detecting section for detecting a speed shift position of the vehicle;

wherein said driving information generating means includes a shift-up evaluating section for determining or evaluating possibility of shift-up operation based on the engine load degree and the speed shift position, and a shift-up information generating section for generating shift-up information based on the evaluation by the shift up operation possibility by the shift-up evaluating section.

12. The condition evaluating system according to claim 7, wherein the engine-driven traveling vehicle is a work vehicle mounting an engine-driven utility implement, and the driving information generating means includes an implement information generating section for generating implement driving assisting information.

13. A condition evaluation system for an engine-driven traveling vehicle, comprising:

a rotational speed detecting section for detecting an engine rotational speed of the engine-driven traveling vehicle as a measured rotational speed;

an accelerator opening degree detecting section for detecting an accelerator opening degree;

a storing section for storing, as a correlation group, a correlation prepared for each accelerator opening degree between an engine rotational speed drop amount from a reference rotational speed which is the engine rotational speed under a zero load condition of the engine and a change in fuel injection amount;

a fuel injection amount calculating means for selecting, from the correlation group, the correlation associated with the accelerator opening degree detected by the accelerator opening degree detecting section, and applying, to the selected correlation, the measured rotational speed detected by the rotational speed detecting section to calculate a fuel injection amount per predetermined unit;

a mileage evaluating section for effecting a mileage evaluation based on the fuel injection amount calculated by the fuel injection amount calculating means;

an engine load degree calculating means for calculating an engine load degree from a partial load degree calculated from the measured engine rotational speed based on a correlation prepared for each accelerator opening degree between an engine rotational speed drop amount from a reference engine rotational speed which is the engine rotational speed under a zero load condition of the engine and a torque change, and also from a maximum load degree for each accelerator opening degree;

a driving information generating means for evaluating a driving condition of the vehicle based on said engine load degree calculated by said engine load degree calculating means, and generating appropriate driving information for the vehicle; and a display panel for displaying information about the mileage evaluation and the appropriate driving information.

* * * * *